United States Patent
Matsuzaki et al.

(10) Patent No.: US 6,680,820 B2
(45) Date of Patent: Jan. 20, 2004

(54) METHOD OF MAINTAINING A CONSTANT FLYING HEIGHT OF A MAGNETIC HEAD AND A MAGNETIC DISK DRIVE UTILIZED THEREFOR

(75) Inventors: Mikio Matsuzaki, Chuo-ku (JP); Kazumasa Fukuda, Chuo-ku (JP); Takamitsu Tsuna, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/158,914

(22) Filed: Jun. 3, 2002

(65) Prior Publication Data

US 2002/0191343 A1 Dec. 19, 2002

Related U.S. Application Data

(63) Continuation-in-part of application No. 09/860,495, filed on May 21, 2001, now abandoned, which is a continuation of application No. 08/396,087, filed on Feb. 28, 1995, now abandoned, which is a continuation of application No. 07/957,778, filed on Oct. 8, 1992, now abandoned.

(30) Foreign Application Priority Data

Oct. 31, 1991 (JP) .............................................. 3/314118

(51) Int. Cl.$^7$ ................................................. G11B 5/60
(52) U.S. Cl. ................................ 360/235.5; 360/236.1; 360/97.01
(58) Field of Search ........................... 360/234.3, 264.1, 360/97.01, 236.1, 235.5, 235.4

(56) References Cited

U.S. PATENT DOCUMENTS 4,870,519 A * 9/1989 White ..................... 360/236.7
4,928,195 A * 5/1990 Ezaki et al. ............. 360/234.3

* cited by examiner

Primary Examiner—Brian E. Miller
(74) Attorney, Agent, or Firm—Oblon, Spivak, McClelland, Maier & Neustadt, P.C.

(57) ABSTRACT

A method of maintaining a constant flying height of a magnetic head: adapted to maintain a flying height of a magnetic head on a magnetic disk substantially constant irrespective of a change of a skew angle, utilizing a device comprising a magnetic disk, a positioning device, a head supporting device and a magnetic head; said positioning device supporting one end of said head supporting device and rotating the head supporting device on a first plane placed on a second plane of said magnetic disk within a predetermined skew angle range; the head supporting device supporting said magnetic head at the other end thereof; the magnetic head being attached with reading/writing elements at an air discharge end of a slider having flying planes on a side of a third plane thereof opposing the magnetic disk; a thickness of said slider from each of the flying planes to an opposite surface on the reverse side thereof being 0.65 mm or less; a length in a first direction of air discharge thereof being 3 mm or less, and a width in a second direction orthogonal to the first direction of air discharge thereof being 2.5 mm or less; wherein a change of the flying height of the magnetic head on the magnetic disk is 0.02 μm or less, when the skew angle is changed in a range of −20 to 20 degree.

7 Claims, 16 Drawing Sheets

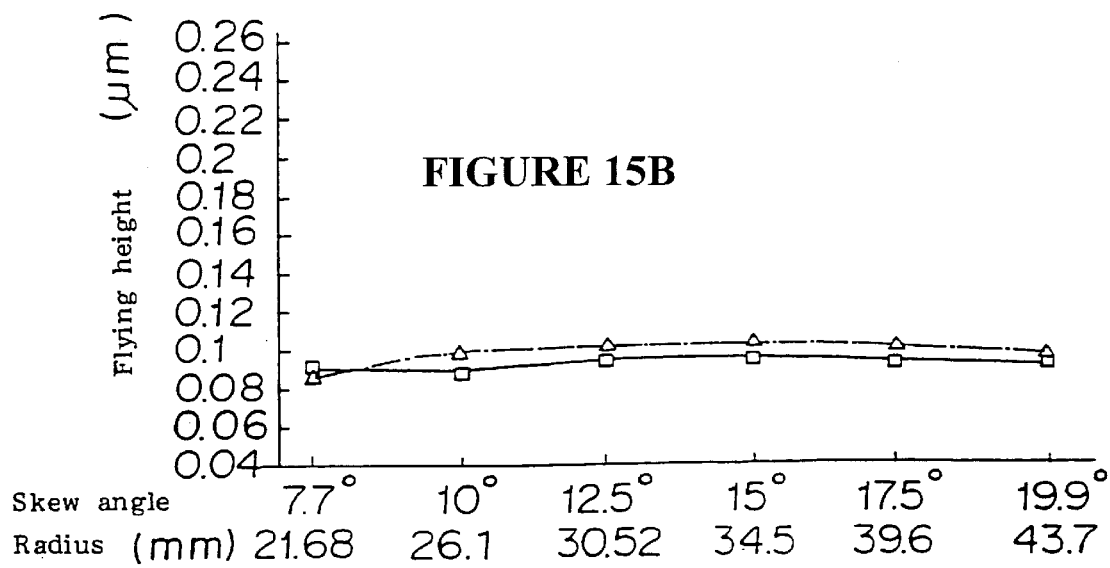

θ1: Positive skew angle (+)
θ2: Negative skew angle (-)
α: Disk rotation direction

METHOD OF MAINTAINING A CONSTANT FLYING HEIGHT OF A MAGNETIC HEAD AND A MAGNETIC DISK DRIVE UTILIZED THEREFOR

This application is a Continuation-in-part (CIP) of application Ser. No. 09/860,495 filed on May 21, 2001 now abandoned which is a CON of Ser. No. 08/396,087 filed Feb. 28, 1995, now abandoned, which is a CON of 07/957,778 filed Oct. 8, 1992, now abandoned.

BACKGROUND OF THE INVENTION

1. Field of the Invention

This invention relates to a magnetic disk drive, particularly to a magnetic disk drive wherein, with respect to outer dimensions of a slider of a magnetic head included as part of the magnetic disk drive along with a magnetic disk and a head supporting device, a thickness from a flying plane to an opposite surface on the reverse side thereof is determined to be 0.65 mm or less, a length thereof in the direction of air discharge to be 3 mm or less, or preferably 0.5 to 3 mm and a width in a direction orthogonal to the direction of air discharge to be 2.5 mm or less, or preferably 0.5 to 2.5 mm. Therefore, it is possible to achieve miniaturization, a high capacity and a high density for the magnetic recording medium, and a smaller diameter of the magnetic disk with high durability and high stability thereof.

2. Discussion of the Background

In a conventional magnetic disk drive, a magnetic head is used which flies by dynamic pressure caused by running a magnetic disk opposed thereto and maintaining head clearance due to a minute air bearing generated between the magnetic disk and the magnetic head. A flying-type magnetic head has a basic structure including reading/writing elements formed on a slider having flying planes on the side of a surface thereof opposing a magnetic disk. As conventional examples, a Winchester-type magnetic head provided with a U-shaped core having a coil at a slider composed of a magnetic body and a composite-type magnetic head attached with a bulk-type reading/writing element in a groove of a slider composed of a nonmagnetic ceramic structure and a thin film magnetic head formed with thin film reading/writing elements on a slider thereof by a process similar to the semiconductor production technology, are well known.

Among these flying-type magnetic heads, the Winchester-type magnetic head and the composite-type magnetic head are publicly known, for instance, by Japanese Examined Patent Publication No. 569/1982 (U.S. Pat. No. 3,823,416), Japanese Examined Patent Publication No. 21329/1983, Japanese Examined Patent Publication No. 28650/1983 or the like. The reading/writing elements are the bulk-type ones provided with coils composed of wires wound around cores.

The thin film magnetic head is publicly known, for instance, by Japanese Examined Patent Publication No. 84019/1980 (U.S. Pat. No. 4,190,872), Japanese Unexamined Patent Publication No. 84020/1980 (U.S. Pat. No. 4,219,854) or the like. The thin film magnetic head is provided with a structure wherein a thin film magnetic film, a conductive coil film, an inter-coil-layer insulating film, a protection film and the like are formed on a slider. With respect to the thin film magnetic head, the inductance value of the conductive coil film is low compared with a bulk-type flying magnetic head, by a single digit or more. Accordingly, the high frequency characteristic thereof is extremely good and the thin film magnetic head has excellent high response performance and is suitable for the high density recording. Owing to this characteristic, the thin film magnetic head can achieve a high speed in data transfer and a high density of magnetic recording in a domain which cannot be reached by the bulk-type flying magnetic head.

Furthermore, the thin film magnetic head is provided with characteristics wherein a magnetic film constructing a magnetic circuit thereof is composed of a metallic magnetic material of permalloy or the like having a high saturation magnetic flux density and a high permeability, a magnetic gap length thereof can be reduced, and a pole width for reading and writing that can be extremely narrowed down. Accordingly, in addition to the excellent high frequency characteristic wherein the inductance value of the conductive coil film and the magnetic film composing a core is low, the thin magnetic head can achieve an excellent high frequency response performance and high recording density compared with the bulk-type flying magnetic head.

Next, explanation will be given of a specific example of the flying-type magnetic head in reference to FIG. 20. FIG. 20 is a perspective view of a conventional magnetic head, wherein a reference numeral 1 designates a slider composed of, for instance, a ceramic structure, and 2, a reading/writing element.

The slider 1 is formed to have two rails 101 and 102 spaced apart from each other on a plane thereof opposing a magnetic disk and the surfaces of the rails 101 and 102 are formed with flying planes 103 and 104 having a high flatness.

With respect to the outer dimension of the slider 1, as shown for instance in U.S. Pat. No. 4,624,048, normally, a thickness d from each of the flying planes 103 and 104 to an opposite surface on the reverse side 105 is selected to be 0.85 mm, a length L in the air discharge direction is selected to be 4 mm and a width w in a direction orthogonal to the air discharge direction is selected to be 3.2 mm. The flying planes 103 and 104 are provided with structures wherein tapered portions 103a and 104a each is provided on the side of an end thereof which makes an inflow end for an air flow that flows in the direction of an arrow mark "a," generated in the combination thereof with a magnetic disk.

The reading/writing element 2 is a thin film element formed by a process similar to the IC production technology in case of a thin film magnetic head, which is attached to an end portion of the air discharge on the opposite side of the tapered portions 103a and 104a. Although not illustrated, the Winchester-type magnetic head, or the composite-type magnetic head is a bulk-type one provided with a coil wound around a core.

When the reading/writing element 2 is composed of a thin film element, with respect to the dimension of the reading/writing element 2, to satisfy a required electromagnetic conversion performance, a diameter D2 thereof in a direction orthogonal to the air discharge direction is determined to be approximately 0.3 mm, and a diameter thereof D1 in a direction from the flying planes 103 and 104 to the opposite surface 105, approximately 0.4 mm. Furthermore, the thin film magnetic head is provided with take-out electrodes 201 and 202 on a side end face of the slider 1 attached with the reading/writing elements. These take-out electrodes 201 and 202 communicate to a conductive coil film of the reading/writing element 2, not shown. The take-out electrodes 201 and 202 are portions to which lead wires communicating to the magnetic disk drive are connected. To provide a lead wire connecting area, a length L0 thereof in a direction orthogonal to the air discharge direction "a" is determined to be about 0.5 mm, and a wire width h1 viewed in the direction of the opposite surface 105 to the flying planes 103 and 104, approximately 0.2 mm.

The above thin film magnetic head is produced utilizing a high accuracy pattern forming technology, such as photolithography, by forming a great number of thin film reading/writing elements on a wafer to be transformed into a portion of the slider 1, by separating the thin film reading/writing elements obtained by performing a cutting operation on the wafer, and by performing a necessary grooving operation on the rails 101 and 102 or the like and polishing the flying planes 103 and 104.

The magnetic disk drive is attached with the above magnetic head on a front end portion of a head supporting device an end of which is supported by a positioning device that positions the magnetic head on predetermined tracks of the magnetic disk and drives the magnetic head by a so-called contact-start-stop (hereinafter CSS) system wherein the flying planes 103 and 104 of the slider 1 contact the surface of the magnetic disk by a spring and starting and stopping thereof are performed in the contact state. Thus, when the magnetic disk is stationary, the flying planes 103 and 104 are pressed to the surface of the magnetic disk by spring pressure. When the magnetic disk rotates, as shown in FIG. 21, a dynamic lift is generated at the flying planes 103 and 104 including the tapered surfaces 103a and 104a of the slider 1, and the magnetic head flies at a flying height "g" wherein the dynamic pressure caused by the dynamic lift balances with the spring pressure "P" of a gimbal. The conventional magnetic head having the above dimensions is provided with a stable flying performance in a domain having a flying height of 0.3 μm or more.

The magnetic disk drive of this kind is utilized in combination with a computer and to meet a requirement of data processing of the computer system, should correspond to the higher density and the higher capacity of the magnetic recording and the downsizing of the magnetic disk diameter.

However, as noted above, the magnetic head utilized in the conventional magnetic disk drive is provided with dimensions wherein the thickness d thereof is selected to be 0.85 mm, the length of L in the air discharge direction is selected to be 4 mm and the width w in a direction orthogonal to the air discharge direction is selected to be 3.2 mm. Therefore, the following problems arise.

(a) To achieve a high recording density, a head spacing loss should be minimized by lowering the head flying height. However, the conventional magnetic head of the above-noted dimensions experiences a high value of a rolling angle. Accordingly, the effective flying height can not be lowered under a value determined by this rolling angle.

FIG. 22 is a diagram for explaining the rolling angle β generated between a magnetic disk M and the magnetic head. The larger the rolling angle β, the larger the difference between the flying height "g1" viewed from the inner peripheral rotating side and a flying height "g2" viewed from the outer peripheral rotating side. Normally, in the magnetic disk drive, a magnetic conversion element 2 on the outer peripheral rotating side of the magnetic head is utilized. Therefore, even when the flying height "g1" on the inner peripheral rotating side thereof is reduced, so far as the rolling angle β remains large, the flying height "g2" on the outer peripheral rotating side thereof which directly influences on the electromagnetic conversion performance, cannot be reduced. Accordingly, in the conventional magnetic head which is limited with respect to the lowering of the rolling angle β, the high density recording which can be achieved by lowering the effective flying height and by reduction of the spacing loss, is also limited. Furthermore, the rolling angle β has a tendency such that the larger a relative speed between the magnetic disk and the magnetic head is, the larger the rolling angle is. Accordingly, the more the magnetic head is placed towards the outer periphery of the magnetic disk, the effective flying height increases as does the spacing loss. Therefore, the desired higher density recording cannot be achieved.

(b) Since the rolling angle β is large, the flying posture of the magnetic head becomes unstable and a head crash is liable to occur. Accordingly, the reliability thereof is lowered.

(c) As a means of solving the above problems caused by the increase of the rolling angle, a method may be considered wherein a center of motion of the slider, that is, a pivot position of a gimbal, is set to a position deviated from the middle of the slider. However, in this case, a deviation of mass is caused with respect to the center of motion of the slider, the moment of momentum becomes nonuniform, and a follow-up performance to vibration thereof is deteriorated. As stated above, in the magnetic head having the conventional dimensions, it is difficult to lower the flying height while stabilizing the flying posture and maintaining reliability.

(d) When the magnetic head is placed stationary on the magnetic disk, the landing area occupied by the magnetic head can not be diminished under an area determined by the length in the air discharge direction of L=4 mm and the width of w=3.2 mm in a direction orthogonal to the air discharge direction. Accordingly, the magnetic recording area which is substantially usable on the magnetic disk is limited by the landing area of the magnetic head, which causes limitations in increasing the track number and increasing the recording density and the recording capacity. This shortcoming is especially and significantly displayed relative to a small magnetic disk. The factor which directly influences the reduction of the track number is the width w, and the conventional magnetic head having the width w as large as 3.2 mm is an obstacle to increasing the number of tracks.

(e) To meet a requirement of downsizing a computer as in a laptop personal computer or the like, the magnetic disk drive per se should be downsided. However, as the conventional slider has a thickness d as large as 0.85 mm, this is a limitation in thinning the magnetic disk drive. Furthermore, as the number of magnetic disks which can be accommodated in the space of the magnetic disk drive is limited by the thickness of the magnetic head, there is a limitation in enhancing the capacity of the magnetic disk drive by increasing the number of disks.

(f) To meet a requirement of portable handling of a computer, the magnetic disk drive should have excellent portability. To provide excellent portability, it is most desirable to drive the magnetic disk drive by a cell. However, in the conventional magnetic head provided with the above-mentioned dimensions, there is a technical difficulty in obtaining a driving torque for a disk driving motor to rotate the magnetic disk stably by using a cell, due to overcoming the static friction of CSS starting.

(g) In the thin film magnetic head, since the area of the end face thereof in the air discharge direction attached with thin film reading/writing elements 2 is a large area determined by the thickness of d=0.85 mm and the width of w=3.2 mm, the spacing or a pitch interval between the thin film reading/writing elements 2 is increased and the number of elements which can be formed in a wafer is decreased. Accordingly, the cost of the thin film magnetic head is raised.

SUMMARY OF THE INVENTION

It is an object of the present invention to solve the above conventional problems and to provide a method of maintaining constant flying height of a magnetic head and a magnetic disk drive utilized therefor, which is suitable for the higher density and the higher capacity of the magnetic recording and the downsizing the magnetic disk diameter and excellent in durability and stability.

According to a first aspect of the present invention, there is provided a method of maintaining a constant flying height of a magnetic head on a magnetic disk substantially constant irrespective of a change of a skew angle comprising the steps of:

rotating the magnetic disk;

providing a slider with flying planes on a side thereof opposing the magnetic disk, with a thickness from each of the flying planes to an opposite surface on a reverse side thereof in a range of 0.30 to 0.65 mm, with a length in a first direction of air discharge thereof in a range of 1.2 to 2.8 mm, and with a width in a second direction orthogonal to the first direction in a range of 1.0 to 2.3 mm, said slider being further provided free of any transverse pressurization contours, slider rolling compensation grooving, or other slider rolling compensation elements on any portion thereof;

attaching a magnetic head at the air discharge end of the slider, said attached magnetic head including reading/writing elements arranged on a first side and an opposite second side of the air discharge end of the slider, providing a head supporting device configured to support the slider and attached magnetic head at a first end thereof by attachment to a middle position of the slider in a manner that does not deviate a center of motion of the slider and does not provide rolling compensation relative to the slider and attached magnetic head;

providing a positioning device configured to support a second end of said head supporting device opposite to said first end at a pivot point in a manner that does not provide rolling compensation relative to the slider and attached magnetic head;

rotating the magnetic disk; and pivoting the first end of the head supporting device relative to the second end thereof supported by the positioning device at said pivot point to thereby move said slider with the attached magnetic head at the first end thereof above said rotating magnetic disk with the first side of the sir discharge end of the slider being oriented in a direction toward the center of the magnetic disk while the opposite second side is oriented in a direction toward the outer periphery of the magnetic disk, said slider movement relative to the rotating magnetic disc being along an arcuate path that establishes a different skew angle between a longitudinal direction of the slider and a tangent of said magnetic disk relative to different radial magnetic disk locations;

wherein the reading/writing element arranged on the first side of the air discharge end of the slider undergoes a first amount of separation from the rotating magnetic disk and the reading/writing element arranged on the opposite second side of the sir discharge end of the slider undergoes a second amount of separation from the rotating magnetic disk that is greater than said first amount of separation due to the slider rolling when said slider with the attached magnetic head is moved above said magnetic disk to said different radial locations associated with different skew angles, with the difference between the second amount of separation and the first amount of separation determining the flying height of the slider and attached magnetic head above the magnetic disk, said flying height not changing more than 0.02 $\mu$m when the flying height is set to be 0.1 $\mu$m and the skew angle is changed in a range of −20 to 20 degrees without providing slider rolling compensation relative to the slider and attached magnetic head or any of the structure moving or supporting the slider and attached magnetic head.

According to a second aspect of the present invention, there is provided the method of maintaining the flying height of the magnetic head according to the first aspect of the invention, further comprising providing the magnetic disk with a diameter approximately within a range of 1.8 inches to 5.25 inches.

According to a third aspect of the present invention, there is provided the method of maintaining the flying height of the magnetic head according to the first aspect of the invention, wherein the diameter of the disk is 2.5 inches or shorter; and the disk is in a shape of circle without a hole in the center thereof.

According to a fourth aspect of the present invention, there is provided the method of maintaining the flying height of the magnetic head according to the first aspect of the invention, wherein the slider is of a negative pressure type.

According to a fifth aspect of the present invention, there is provided the method of maintaining the flying height of the magnetic head according to the first aspect of the invention, wherein the diameter of the disk is 2.5 inches or shorter;

the disk is in a shape of circle without a hole in the center thereof;

the slider is of a negative pressure type; and the number of the magnetic head and the number of the magnetic disk are one.

According to a sixth aspect of the present invention, there is provided magnetic disk drive comprising:

a magnetic disk;

a disk support configured to support said magnetic disk;

a drive mechanism configured to rotate said disk support and said magnetic disk supported thereby;

a slider configured to have flying planes on a side thereof opposing the magnetic disk, with a slider thickness from each of the flying planes to an opposite surface on a reverse side thereof being 0.30 to 0.65 mm, with a slider length in a first direction of air discharge thereof being 1.2 to 2.8 mm, and with a slider width in a second direction orthogonal to the first direction being 1.0 to 2.3 mm, said slider further being configured to be free of any transverse pressurization contours, slider rolling compensation grooving, or other slider rolling compensation elements on any portion thereof;

a magnetic head attached at the air discharge end of the slider and having reading/writing elements arranged on first and second apposite sides of an air discharge end of the slider;

a head supporting device configured to support the slider at a first end thereof coupled to a middle position of the slider so as to not deviate a center of motion of the slider and in a manner that does not provide rolling compensation relative to the slider and attached magnetic head; and a positioning device configured to support a second end of said head supporting device opposite to said first end at a pivot point and being configured to pivot the head supporting device around the pivot point to move the head supporting device above said rotating magnetic disk in a manner that does not provide rolling compensation relative to the slider and attached magnetic head with the first side of the air discharge end of the slider being oriented in a direction toward the center of the magnetic disk while the opposite second side is oriented in a direction toward the outer periphery of the magnetic disk, said slider movement relative to the rotating magnetic disc being along an arcuate path having an arc determined by a length of the pivoting head supporting device, said arc determining a different skew angle between a longitudinal direction of the slider and a tangent of said magnetic disk relative to different radial locations of the slider with attached magnetic head over the magnetic disk;

wherein the reading/writing element arranged on the first side of the air discharge end of the slider undergoes a first amount of separation from the rotating magnetic disk and the reading/writing element arranged on the opposite second side of the air discharge end of the slider undergoes a second amount of separation from the rotating magnetic disk that is greater than said first amount of separation due to the slider rolling when said slider with the attached magnetic head is moved above said magnetic disk to said different radial locations associated with different skew angles, with the difference between the second amount of separation and the first amount of separation establishing a flying height of the slider and attached magnetic head, with said flying height being maintained at about 0.1 $\mu$m with changes to the flying height of the slider and attached magnetic head being 0.02 $\mu$m or less when said slider with the attached magnetic head is moved above said rotating magnetic disk to said different radial locations associated with different skew angles without providing rolling compensation relative to the slider and attached magnetic head or any of the structure moving or supporting the slider and attached magnetic head.

According to a seventh aspect of the present invention, there is provided the magnetic disk drive according to the sixth aspect of the invention, wherein each of the reading/writing elements is a thin film element.

According to an eighth aspect of the present invention, there is provided the magnetic disk drive according to the sixth or seventh aspect of the invention, wherein each of the flying planes is a plane having no tapered portion at an air inflow end thereof.

According to a ninth aspect of the present invention, there is provided the magnetic disk drive according to the sixth aspect of the invention, wherein said positioning device is configured to pivot and move the slider to radial locations over the magnetic disk that correspond to skew angles in askew angle range of −5 to 20 degrees.

According to a tenth aspect of the present invention, there is provided the magnetic disk drive according to the sixth aspect of the invention, wherein said positioning device is configured to pivot axed move the slider to radial locations over the magnetic disk that correspond to skew angles in a skew angle range of −20 to 20 degrees.

According to an eleventh aspect of the present invention, there is provided the magnetic disk drive according to the tenth aspect of the invention, further comprising configuring the magnetic disk to have a diameter approximately within a range of 1.8 inches to 5.25 inches.

According to a twelfth aspect of the present invention, there is provided the magnetic disk drive according to the sixth aspect of the invention, wherein the diameter of the disk is 2.5 inches or shorter and the disk is in a shape of circle without a hole in the center thereof.

According to a thirteenth aspect of the present invention, there is provided the magnetic disk drive according to the sixth aspect of the invention, wherein the slider is of a negative pressure type.

According to a fourteenth aspect of the present invention, there is provided the magnetic disk drive according to the sixth aspect of the invention, wherein the diameter of the disk is 2.5 inches or shorter;

the disk is in a shape of circle without a hole in the center thereof;

the slider is of a negative pressure type; and the number of the magnetic head and the number of the magnetic disk are one.

It has been found that the slider having the dimensions wherein the thickness from each of the flying planes to the opposite surface is 0.65 mm or less, the length in the air discharge direction is 3 mm or less, or preferably 0.5 to 3 mm, and the width in a direction orthogonal to the air discharge direction is 2.5 mm or less, or preferably 0.5 to 2.5 mm, has high flying stability while maintaining a low flying height. This is because, compared with the conventional magnetic head, the rolling angle (or rolling value) is considerably reduced exceeding a predictable range. Moreover, as shown later in actual measurement data, the lowering of the rolling angle is especially remarkable at the outer peripheral side of the magnetic disk wherein the skew angle is large. Accordingly, at the outer peripheral side of the magnetic disk having a large skew angle, which essentially necessitates the lowering the rolling angle, the increase of the effective flying height and the increase of the spacing loss are restrained, thereby achieving higher density recording.

In this application, since the selection of the configuration of the slider is performed as a means of reducing the rolling angle, the alteration in the center of motion of the slider or the like in not necessary. Accordingly, there are no problems of the deviation of mass with respect to the center of motion of the slider, the nonuniformity of the moment of momentum or the like, and therefore, the flying height can be reduced while stabilizing the flying posture and providing reliability.

Furthermore, as shown in actual measurement data infra, it is found that a constant flying height can be maintained without being influenced substantially by the size of the skew angle. As means of maintaining the flying quantity constant without being influenced by the size of skew angle, there are inventions disclosed, for instance, in Japanese Unexamined Patent Publication No. 278087/1986, U.S. Pat. Nos. 4,673,996, and 4,870,519. The sliders disclosed in these prior arts, are provided with shallow grooves on the side faces of rails, which are called a transverse pressure contour slider (TPC). In this application, the flying height is maintained constant without being influenced by the size of the skew angle by the selection of the dimensions of the slider and not by the grooving operation of the slider. Therefore, the invention is provided with an advantage wherein the TPC grooving of a slider is not necessary.

Furthermore, since the constant flying height can be maintained without being influenced substantially by the size of skew angle, it is possible to adopt a zone bit recording system. Therefore, a magnetic disk drive having a high density recording and a high capacity can be obtained. Furthermore, since the constant flying height can be maintained without being influenced substantially by the size of the skew angle, the skew angle can be set at a large value, thereby miniaturizing the magnetic disk drive.

Furthermore, since the width in a direction orthogonal to the air discharge direction is 2.5 mm or less, compared with a slider having a conventional magnetic head, the landing area occupied by the magnetic head on the magnetic disk when the magnetic head is placed stationary on the magnetic disk is considerably reduced. Accordingly, the number of tracks on the magnetic disk is increased, which contributes to the increase of the recording density and the memory capacity thereof. This operation is significantly effective particularly in a magnetic disk having a small diameter.

Since the thickness d of the slider is 0.65 mm or less, the magnetic disk device can be thinned by 70% or less of the conventional device. Furthermore, the number of magnetic disks which can be accommodated in the magnetic disk drive, is increased, thereby achieving a higher capacity thereof.

When the thickness d from each of the flying planes to the opposite surface on the reverse sides exceeds 0.65 mm, the position of the center of gravity thereof is shifted on the side of the opposite surface which is a plane connecting to a gimbal, thereby deteriorating the flying stability. When the thickness is too thin, the rigidity of the slider is lowered, torsion or deformation thereof is caused in the slider and the flatness of the air bearing plane can not be provided. Accordingly, the thickness d is set to a lower limit value which can provide the flatness of the necessary air bearing plane, in a range of 0.65 mm or less. Furthermore, when the length L and the width w are too small, a flying plane area sufficient for securing stable flying performance may not be provided, thereby deteriorating the flying stability. Accordingly, the lower limit values of the length L and the width w are preferably 0.5 mm or more.

Furthermore, by the miniaturization of the total configuration of the slider, the dynamic lift is reduced and accordingly, the spring pressure can be lowered. Therefore, the loading force exerted between the flying plane and the magnetic disk in contacting the magnetic head to the magnetic disk is lowered and therefore, friction and wear are diminished thereby promoting the durability thereof.

Furthermore, since the static friction in the CSS starting, is reduced, the driving torque of the disk driving motor is decreased thereby reducing the power consumption. Since the disk driving motor consumes most of the power for the total of the magnetic disk drive, the power consumption of the total of the magnetic disk drive is reduced, thereby realizing a magnetic disk drive capable of driving the device by a cell.

Compared with the slider in the conventional magnetic head, the total configuration is miniaturized and particularly in the thin film magnetic head, the area of the end face of the slider to be attached with the reading/writing elements is decreased. Accordingly, when the reading/writing elements are formed by thin film elements, the number of the reading/writing elements which can be formed in a wafer is increased thereby contributing significantly to cost reduction.

Furthermore, by the weight reduction thereof in accordance with the selection of dimensions thereof, the following operations can be provided.

First, compared with the slider in the conventional magnetic head, the mass of the slider can be significantly reduced. Therefore, the resonance frequency of a head-gimbal system is increased and crashing is eliminated even when using a low flying height of 0.2 µm or less thereby promoting CSS reliability.

Further, by the reduction of the mass thereof, the load applied to an actuator for accessing is reduced and high speed accessing can be performed. Especially, in case of the thin film magnetic head, to the inherent performance wherein the inductance value of the conductive coil film is low, the high frequency performance is excellent and the high speed response performance is excellent, the high speed accessing is synergetically multiplied, thereby dramatically elevating the reading/writing speed and the data transfer speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 15B designates data showing a relationship among the skew angle (degree) of the magnetic head in the invented magnetic disk drive, the corresponding radius of rotation of a magnetic disk (mm) and the flying height (µm);

DETAILED DESCRIPTION OF THE PREFERRED EMBODIMENTS

Figure 1:
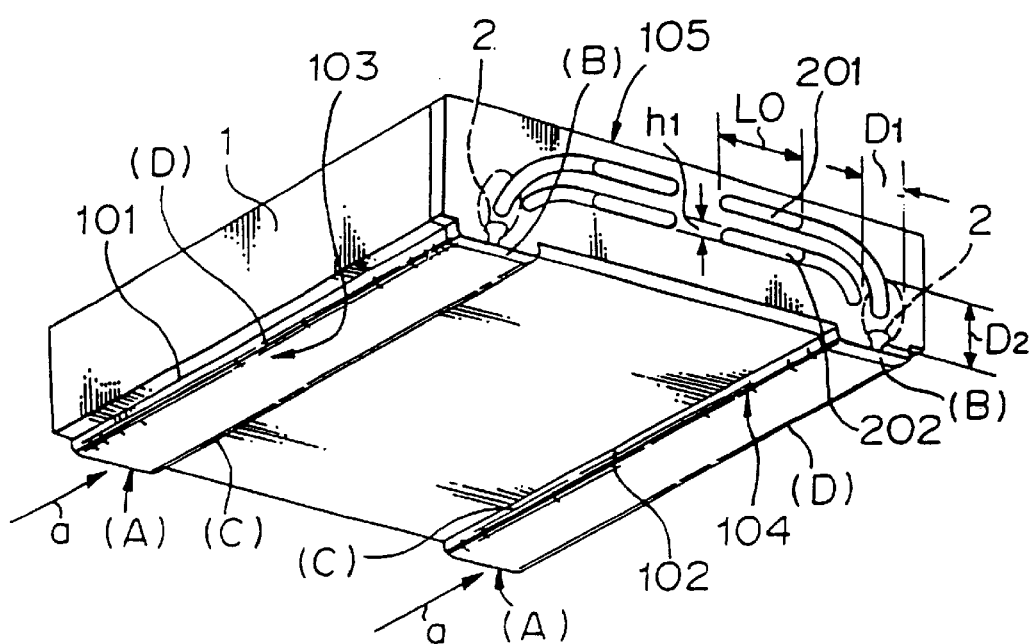
FIG. 1 is a perspective view of a magnetic head constituting a magnetic disk drive according to the present invention.
Figure 2:
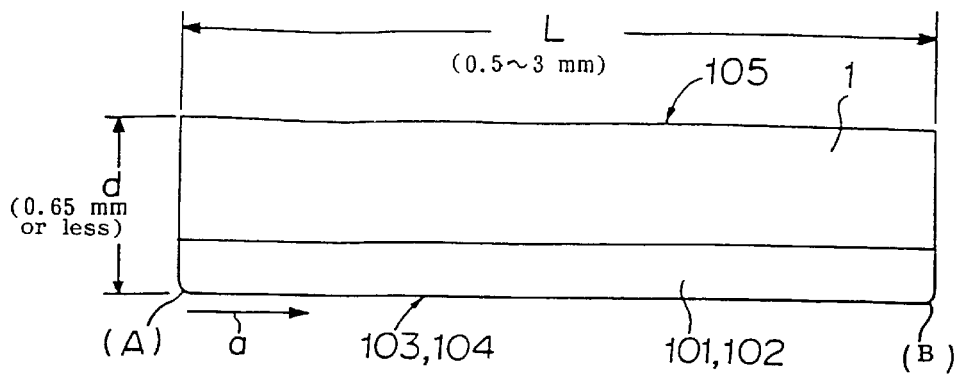
FIG. 2 is a front view of a slider of the magnetic head constituting the magnetic disk drive according to the present invention.
Figure 3:
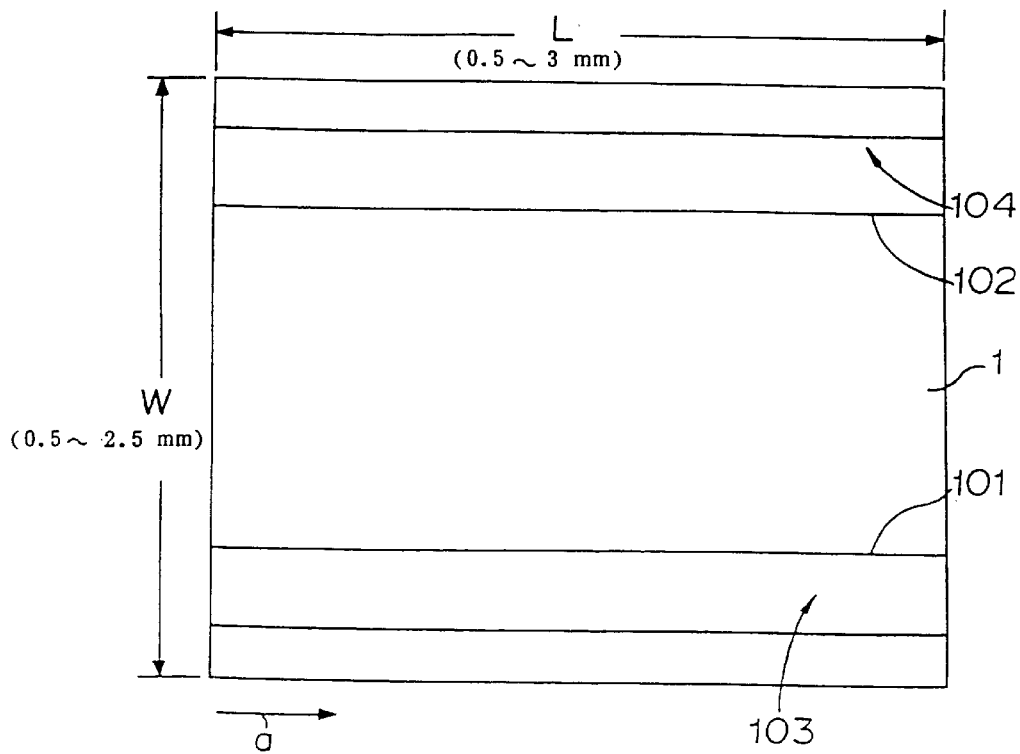
FIG. 3 is a bottom view of the slider of the magnetic head constituting the invented magnetic disk drive, viewed from the side of a flying plane thereof.
Figure 4:
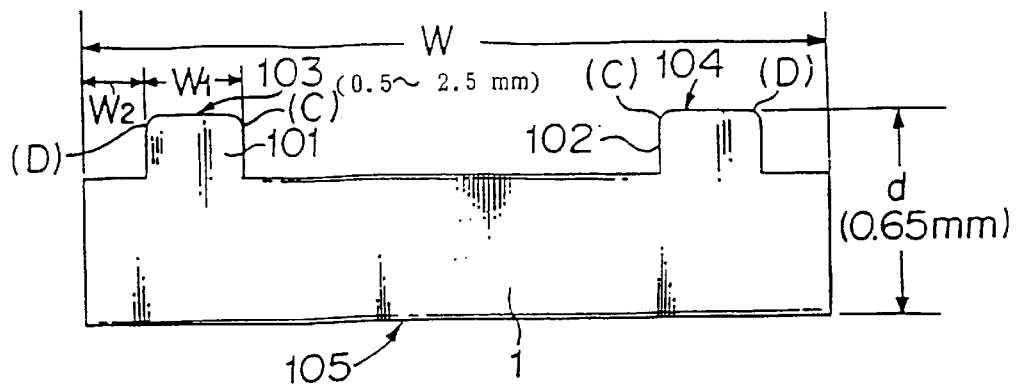
FIG. 4 is a side view of the slider of the magnetic head constituting the invented magnetic disk drive.
Figure 20:
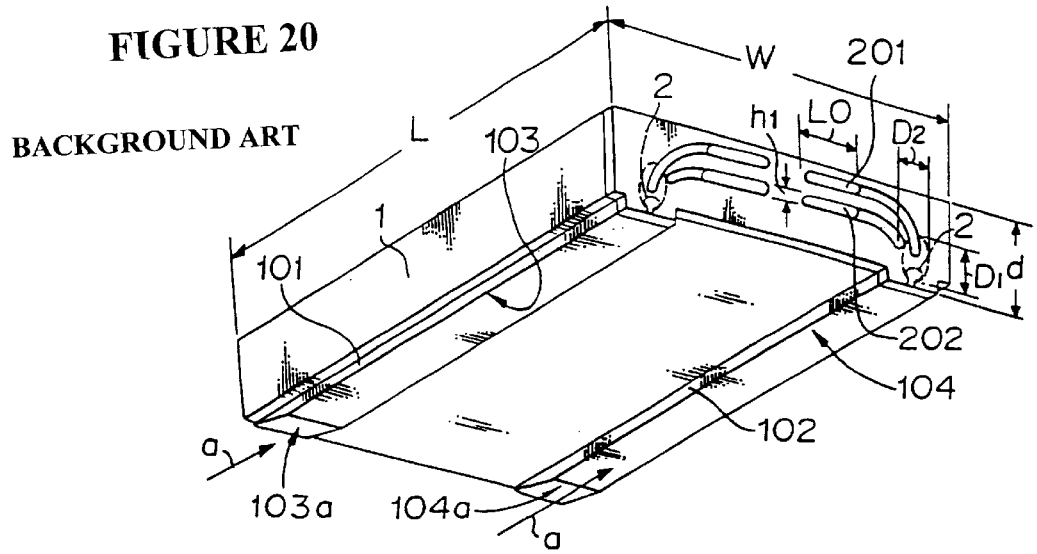
FIG. 20 is a perspective view of a conventional magnetic head.
Figure 21:
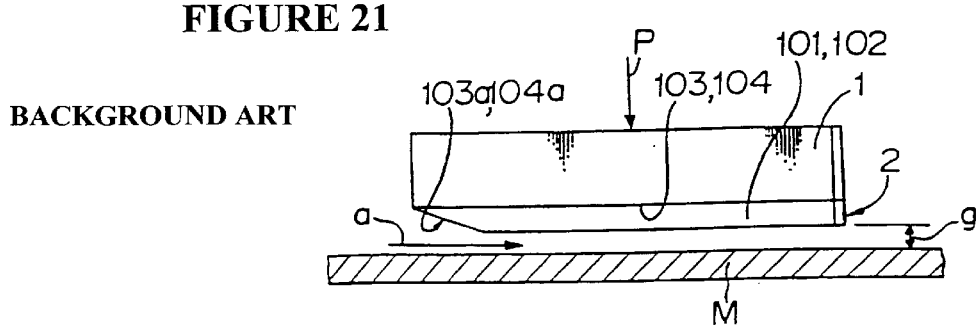
FIG. 21 is a diagram showing a state of operation of a flying-type magnetic head.

FIG. 1 is a perspective view of a magnetic head which is a principal component of a magnetic disk drive according to the present invention, FIG. 2, a front view of a slider, FIG. 3, a bottom view of the slider viewed from the side of flying planes thereof, and FIG. 4, a side view of a slider. In these Figures, the notation the same with those in FIG. 20 designates the same or the corresponding element. In the slider 1, the thickness d from each of the flying planes 103 and 104 to the opposite surface on the reverse side 105 is determined to be 0.65 mm or less, the length L in the direction of the air discharge (running direction) "a," is 0.5 to 3 mm, and the width in a direction orthogonal to the air discharge direction "a," is 0.5 to 2.5 mm. Since the thickness of the attached portion of the reading/writing element 2 is substantially negligible compared with the length L, the length L is a dimension substantially including the thickness of the reading/writing element 2. The reading/writing element 2 in this embodiment is a thin film element.

As an example, the diameter D1 of the reading/writing element 2 in a direction orthogonal to the air discharge direction, is determined to be 0.3 mm and the length L0 of each of take-out electrodes 201 and 202 in a direction orthogonal to the air discharge direction, 0.5 mm as representative values of the dimension thereof. When two reading/writing elements 2 are provided, the total width composed by these elements is 2(D1+L0) which is 1.6 mm. When the width w in a direction orthogonal the air discharge direction "a" is determined to be 2.5 mm as disclosed in this application, an allowance of 0.9 mm can be provided.

As shown in the embodiment of FIGS. 1 through 4, the flying planes 103 and 104 of the slider 1 can be provided with a planar shape having no tapered portions. Edges (A) and (B) of the flying planes 103 and 104 viewed in the air discharge direction "a," are preferably formed in an arcuate shape to prevent scratching between the slider and the surface of the magnetic disk in the CSS operation. Other edges (C) and (D) of the flying planes can be also formed in an arcuate shape. Furthermore, it is possible to provide a structure to the slider wherein a rail is provided in a substantially middle portion in the width direction, the surface of which serves as a flying plane. This structure is convenient for achieving the miniaturization of the total device.

Furthermore, when the length and the width of the slider are respectively determined to be 0.5 mm or more and 1.5 mm or less, the total surface of the slider opposing the disk may be a flying plane.

Figure 5A:
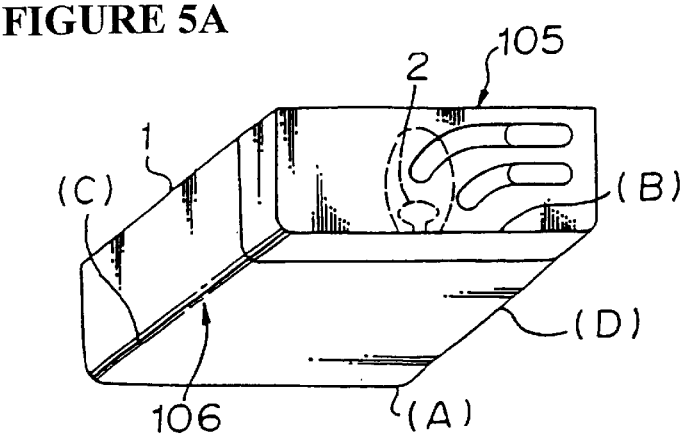
FIGS. 5A and 5B are perspective views of other embodiments of magnetic heads constituting magnetic disk drives according to the present invention.
Figure 5B:
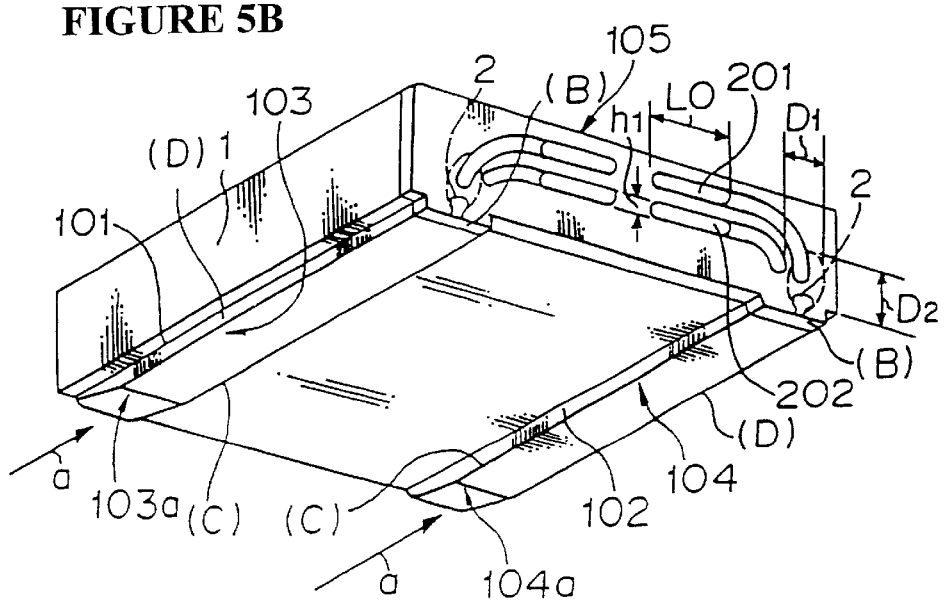

FIGS. 5A an 5B designate perspective views of other embodiments of magnetic heads according to the present invention. In the embodiment of FIG. 5A, the flying plane 106 of the slider 1 is a plane having no rails, and edges thereof (A) through (D) are formed in an arcuate shape. In the embodiment of FIG. 5B, as in the conventional example of FIG. 20, the tapered planes 103a and 104a are provided in the flying planes 103 and 104.

In the above magnetic heads, the recording area thereof is increased and a stable flying characteristic can be provided at a low flying height of 0.2 $\mu$m or less in the combination thereof with a head supporting device and a high durability thereof can be achieved. Next, explanation will be given to specific examples. In the structure shown in the embodiment of FIGS. 1 through 4, with respect to the outer dimensions of the slider 1, the thickness is determined as d=0.65 mm, the length, L=2.8 mm, the width, w=2.3 mm and the width of each of the flying planes 103 and 104, $w_1$=0.3 mm.

Figure 6:
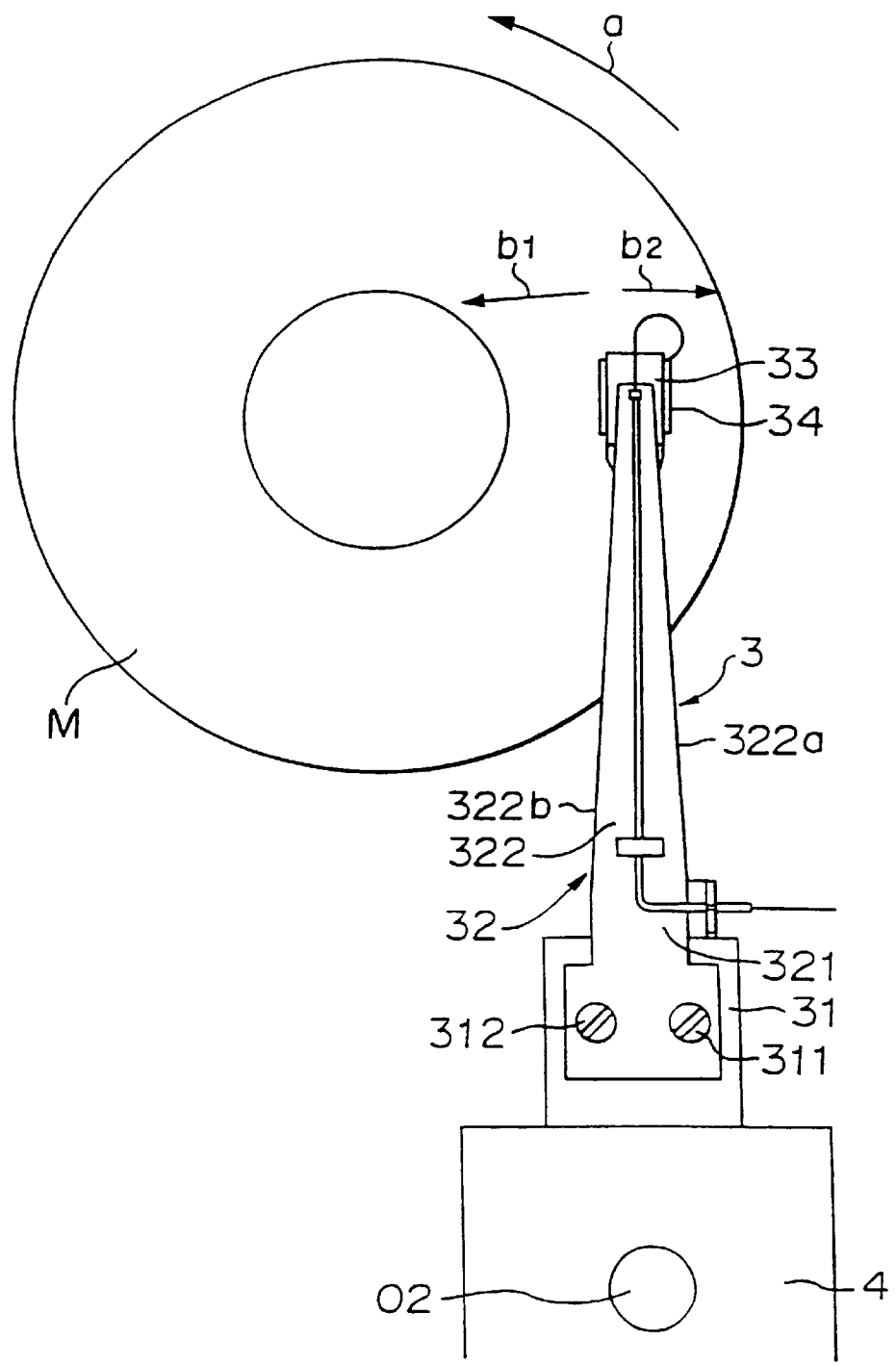
FIG. 6 is a diagram showing a magnetic disk drive according to the present invention.

FIG. 6 designates a magnetic disk drive of this invention wherein the magnetic head is attached to the head supporting device. A notation M designates the magnetic disk, 3, the head supporting device, and 4, a positioning mechanism. The magnetic disk M is driven to rotate in the direction of an arrow mark "a" by a rotating driving mechanism, not shown. The head supporting device 3 is positioned by the positioning mechanism 4 by driving to rotate it in a predetermined angle (skew angle) range in directions of an arrow mark "b1" or "b2" around a center of rotation at a supporting point 02. In this way, the magnetic recording and playback are performed between the magnetic disk M and the magnetic head at predetermined tracks, which constitute a swing-arm-type magnetic disk drive.

In the structure of the head supporting device 3, an end of a supporter 32 composed of a resilient thin metal plate is attached and fixed to a rigid arm 31 which is fixed to the positioning mechanism 4 by fasteners 311 and 312, a flexible body 33 composed similarly by a metallic thin plate is attached to a free end or an end of the supporter 32 in the longitudinal direction thereof and a magnetic head 34 is attached to the bottom surface of the flexible body 33. A portion of the supporter 32 which is attached to the rigid arm 31 constitutes an elastic spring 321 and contiguous to the elastic spring 321, a rigid beam 322 is formed. The rigid beam 322 is provided with flanges 322a and 322b which are formed by bending both end portions of the rigid beam 322, thereby providing a loading force for pressing the magnetic head 34 to the magnetic disk M. In this example, the lengths, the thicknesses and the spring constants or the like of the rigid arm 31, the supporter 32 and the flexible body 33 are determined so that a value of the load exerted from the magnetic head 34 to the magnetic disk M is 9.5 g or less.

Figure 7:
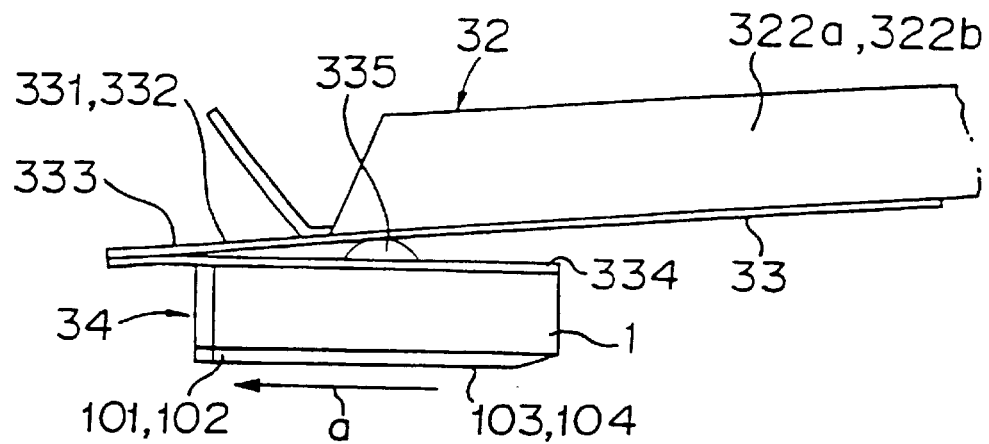
FIG. 7 is a front view of an important part of a head supporting device constituting the magnetic disk drive according to the present invention.
Figure 8:
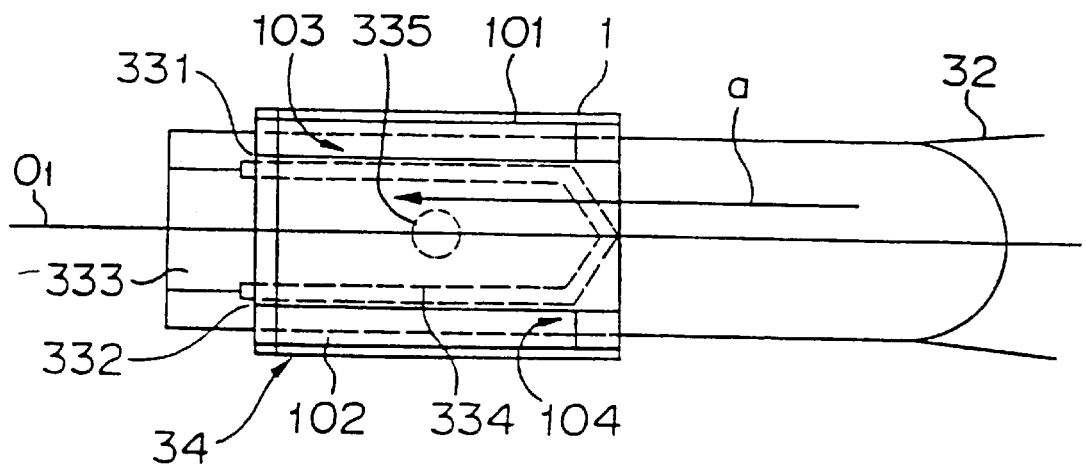
FIG. 8 is a bottom view of a head supporting device constituting the magnetic disk drive of this invention, viewed from the side of a flying plane thereof.

FIG. 7 is a front view of an important part of the head supporting device, and FIG. 8, a bottom view thereof viewed from the side of the flying plane. The flexible body 33 is composed of two outer flexible frames 331 and 332 extended in approximately parallel with an axial line of the supporter 32 in the longitudinal direction thereof, a transverse frame 333 which connects the outer flexible frames 331 and 332 at an end of the flexible body 33 on the opposite side of the supporter 32, and a central tongue 334 extended in approximately parallel with the outer flexible frames 331 and 332 from approximately a middle portion of the transverse frame 333 having a free end. An end of the flexible body 33 on the side of the transverse frame 333, is attached to the vicinity of the free end of the supporter 32 by welding or the like.

The upper face of the central torque 334 of the flexible body 33 is provided with a protrusion for loading 335 having for instance, a semispherical shape or the like, and the load is transmitted from the free end of the supporter 32 to the central tongue 334 via the protrusion for loading 335. The magnetic head 34 of this invention is attached to the lower face of the central tongue 334 by bonding or the like.

In the construction of FIG. 6, when the magnetic head flies at a portion of the magnetic disk M wherein the peripheral speed thereof is 9 m/s, a flying height of 0.09 $\mu$m is achieved.

When the dimensions of the slider 1 are set to the above values, and when general thin film reading/writing elements are formed each having a track width of 8 $\mu$m and a track pitch of 12.7 $\mu$m, the recording area on the magnetic disk M can be increased by about 80 tracks compared with a thin film magnetic head using of a slider of conventional dimensions.

Figure 9:
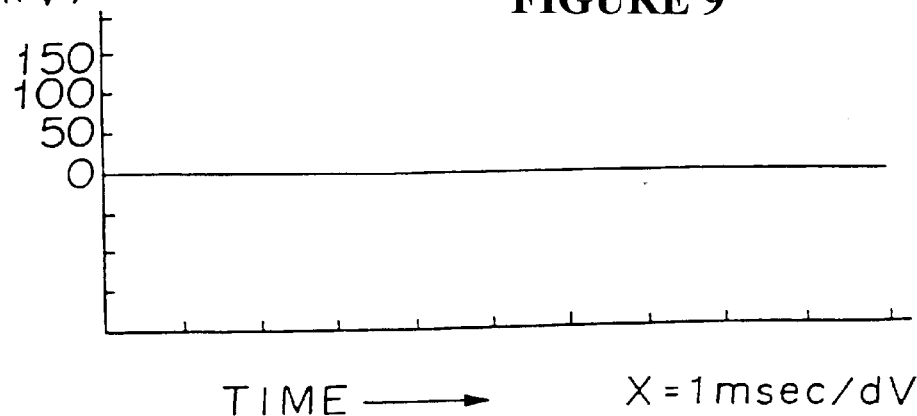
FIG. 9 is a diagram showing a measurement data of the flying stability of the magnetic disk drive according to the present invention.
Figure 10:
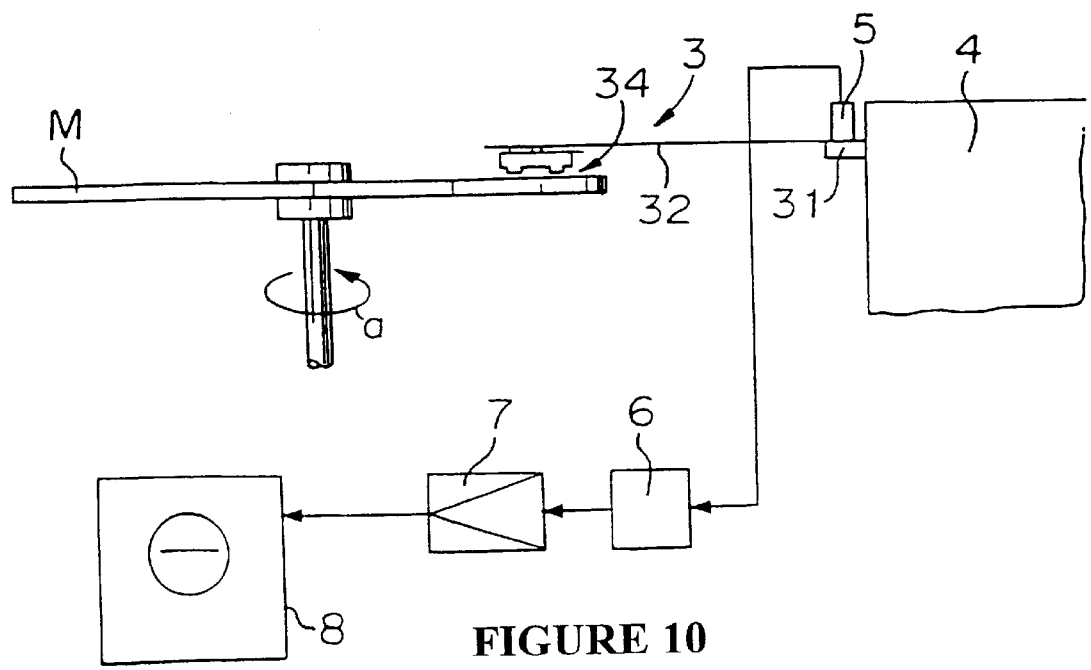
FIG. 10 is a diagram showing a measurement system for obtaining the measurement data of FIG. 9.

FIG. 9 is a diagram showing measurement data for the flying characteristic of the magnetic disk drive shown in FIGS. 6 through 8. The measurement data of FIG. 9 is obtained by a measurement system shown in FIG. 10. In FIG. 10, a reference numeral 5 designates an acoustic emission sensor (hereinafter AE sensor), 6, a filter, 7, an amplifier and 8, an oscilloscope. Measurement conditions in FIG. 10 are as follows.

Flying height of the magnetic head 34; 0.09 $\mu$m.

Load Force; 9.5 g.

Peripheral speed of the magnetic disk M; 9 m/s.

Measurement frequency; 150 to 400 kHz.

Amplification degree; 60 dB.

Surface smoothness of the magnetic disk M; $R_{max}$ 100 Å.

Oscilloscope 8; X-axis 5 sec/div,
    Y-axis 50 mv/div.

As shown in the measurement data of FIG. 9, in the magnetic disk device in use of the flying-type magnetic head 34 of this invention, almost no output of the AE sensor is generated. Based on this experiment, it is found that the flying-type magnetic head of this invention is provided with a stable flying characteristic maintaining a stable flying posture even when the flying height is provided with a low value of 0.09, um.

Figure 11:
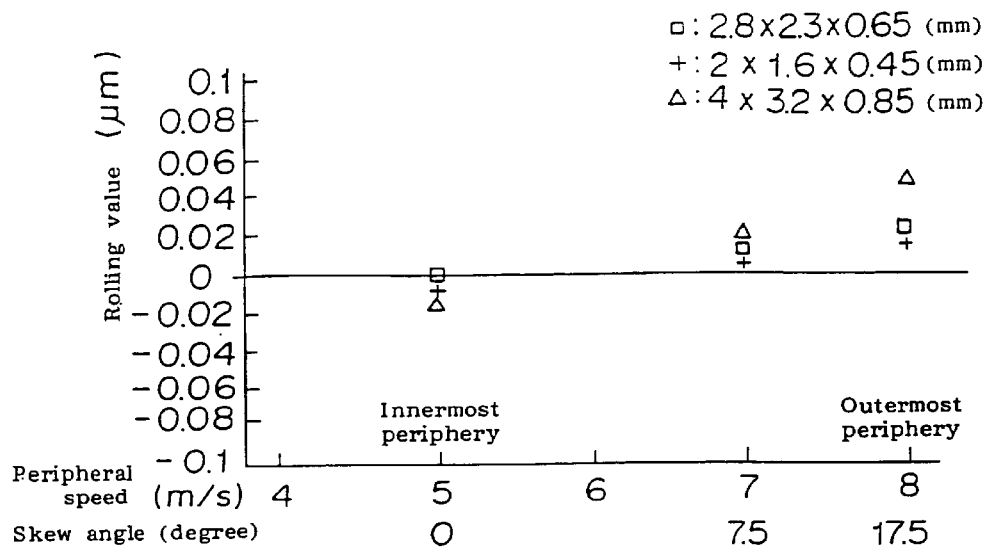
FIGS. 11 through 14 designate data showing a relationship among the peripheral speed of the magnetic disk (m/s), the skew angle (degree) of the magnetic head and the rolling angle (µm)
Figure 12:
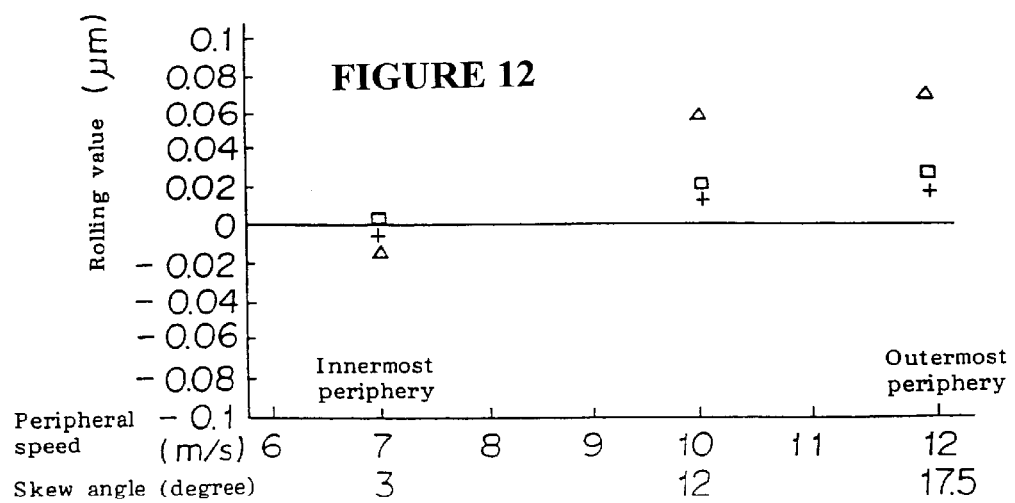
Figure 13:
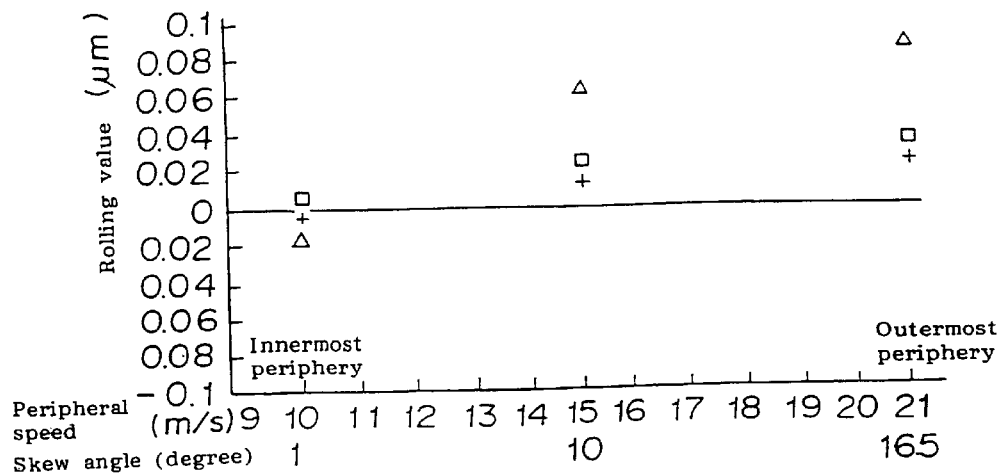
Figure 14:
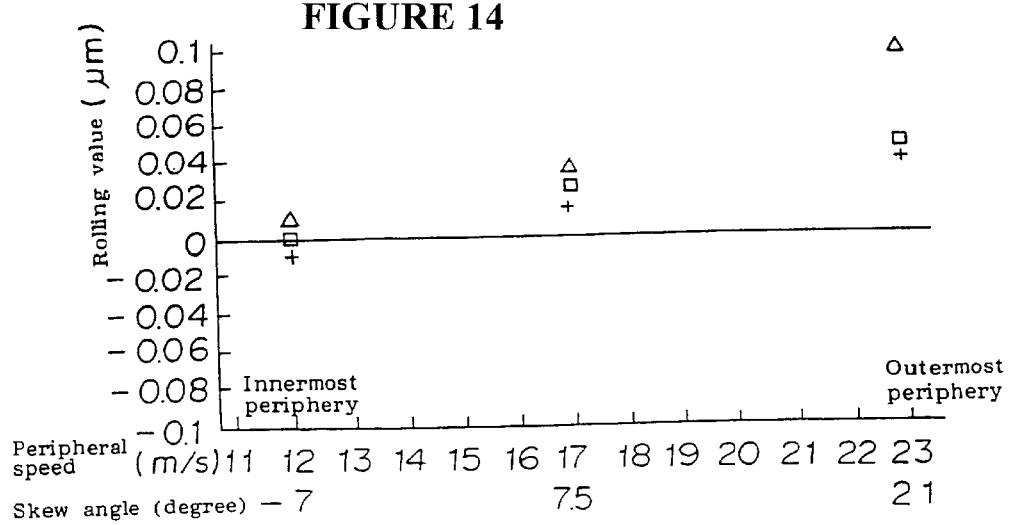
Figure 22:
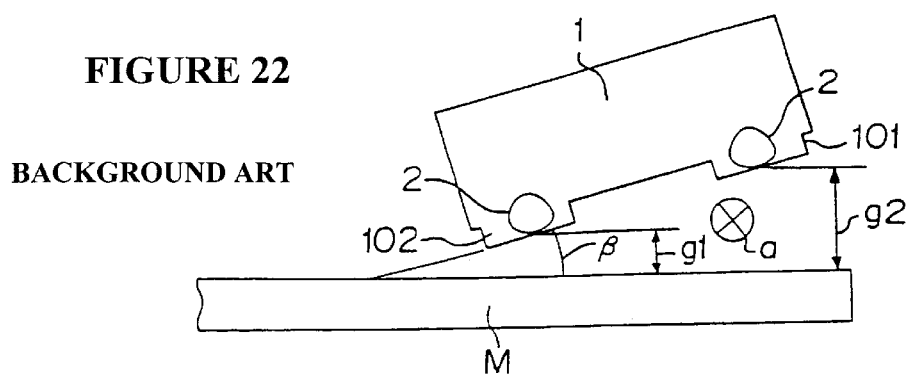
FIG. 22 is a diagram showing a state of operation of a flying-type magnetic head.

The fact that the magnetic head of this invention maintains the stable flying posture at a low flying height, is substantiated by actual measurement data of FIGS. 11 through 14. The data in FIGS. 11 to 14 are obtained by the swing-arm-type magnetic disk device shown in FIG. 6. In FIGS. 11 through 14, the abscissas designate the peripheral speed of the magnetic disk (m/s) and the skew angle (degree) of the magnetic head, and the ordinates, the rolling value ($\mu$m). The rolling value is an absolute value of the difference between the flying height on the side of outer periphery and the flying height on the side of inner periphery of the air bearing plane. For instance, referring to FIG. 22, it is the difference |g2−g1| between the flying height "g2" of the rail 101 and the flying height "g1" of the rail 102. Accordingly, the rolling value is equivalent to the rolling angle. FIG. 11 designates the characteristic of a magnetic disk having a diameter of 1.8 inch, FIG. 12, the characteristic of a magnetic disk having a diameter of 2.5 inch, FIG. 13, the characteristic of a magnetic disk having a diameter of 3.5 inch, and FIG. 14, the characteristic of a magnetic disk having a diameter of 5.25 inch, respectively. In FIGS. 11 through 14, □ marks displayed on data plotting points designate data when a magnetic head having dimensions shown below (hereinafter, magnetic head A) is utilized;

L×W×d=2.8 mm×2.3 mm×0.65 mm, + marks designate data when a magnetic head having dimensions shown below (hereinafter, magnetic head B) is utilized;

L×W×d=2 mm×1.6 mm ×0.45 mm, Δ marks designate data when a magnetic head having dimensions shown below (hereinafter, magnetic head C) is utilized;

L×W×d=4 mm×3.2 mm×0.85 mm.

Accordingly, the Δ marks designate data of a conventional magnetic head and □ marks and + marks, data of invented magnetic heads.

As shown in FIGS. 11 through 14, in these invented magnetic heads, compared with the conventional magnetic head, the rolling value, that is, the rolling angle is reduced. Especially, at around the outer periphery wherein the peripheral speed is increased, the rolling angles of the invented magnetic heads are considerably reduced compared with the rolling angle of the conventional magnetic head. In the invented magnetic heads, compared with the conventional magnetic head, the differences of the rolling values between the innermost periphery and the outermost periphery of magnetic disk are considerably reduced. Accordingly, in this invention, the magnetic head is provided with a stable flying posture over the whole area of the magnetic disk. Furthermore, since the rolling angles are reduced, a magnetic head is provided wherein the effective flying height is lowered, the spacing loss is reduced and the head is suitable for high recording density.

The data of FIGS. 11 through 14 includes a remarkable technological matter. When the rolling value or the rolling value is proportional to the dimension of the magnetic head, the value of the □ mark which is the data of the magnetic head A should be around 70% of the data of the Δ mark which is the data of the magnetic head C. Furthermore, the value of the + mark which is the data of the magnetic head B, should be at a position around that of 50% of the value of the data of the Δ mark which is the data of the magnetic head C. However, the data in FIGS. 11 through 14 are not in such a way. Surprisingly, the □ mark, and + mark which are the data of the magnetic heads A and B, have values which are near to each other, and there clearly is a difference of significance between the □ mark or the + mark and the Δ mark, which is the data of the magnetic head C. In observing these data, it can be predicted that there is a critical point which lowers the rolling angle, to around 75% of a ratio of dimension of the invented magnetic head as compared to the conventional one.

Furthermore, in observing FIGS. 11 through 14, the above difference of significance is remarkably shown at the outer periphery side where a relative speed between the magnetic c disk and the magnetic head is increased. Accordingly, the increase of the effective flying height and the increase of spacing loss are restrained on the outer periphery side of the magnetic disk where the lowering of the rolling angle is most essential to thereby achieve high density recording.

As stated above, according to the present invention, the magnetic disk drive is provided with a surprising effect wherein the rolling angle is lowered in a range not predictable by the ratio of dimension between the invented magnetic head and the conventional magnetic head, and the spacing loss thereof is reduced, all of which makes it suitable for high density recording.

Figure 15A:
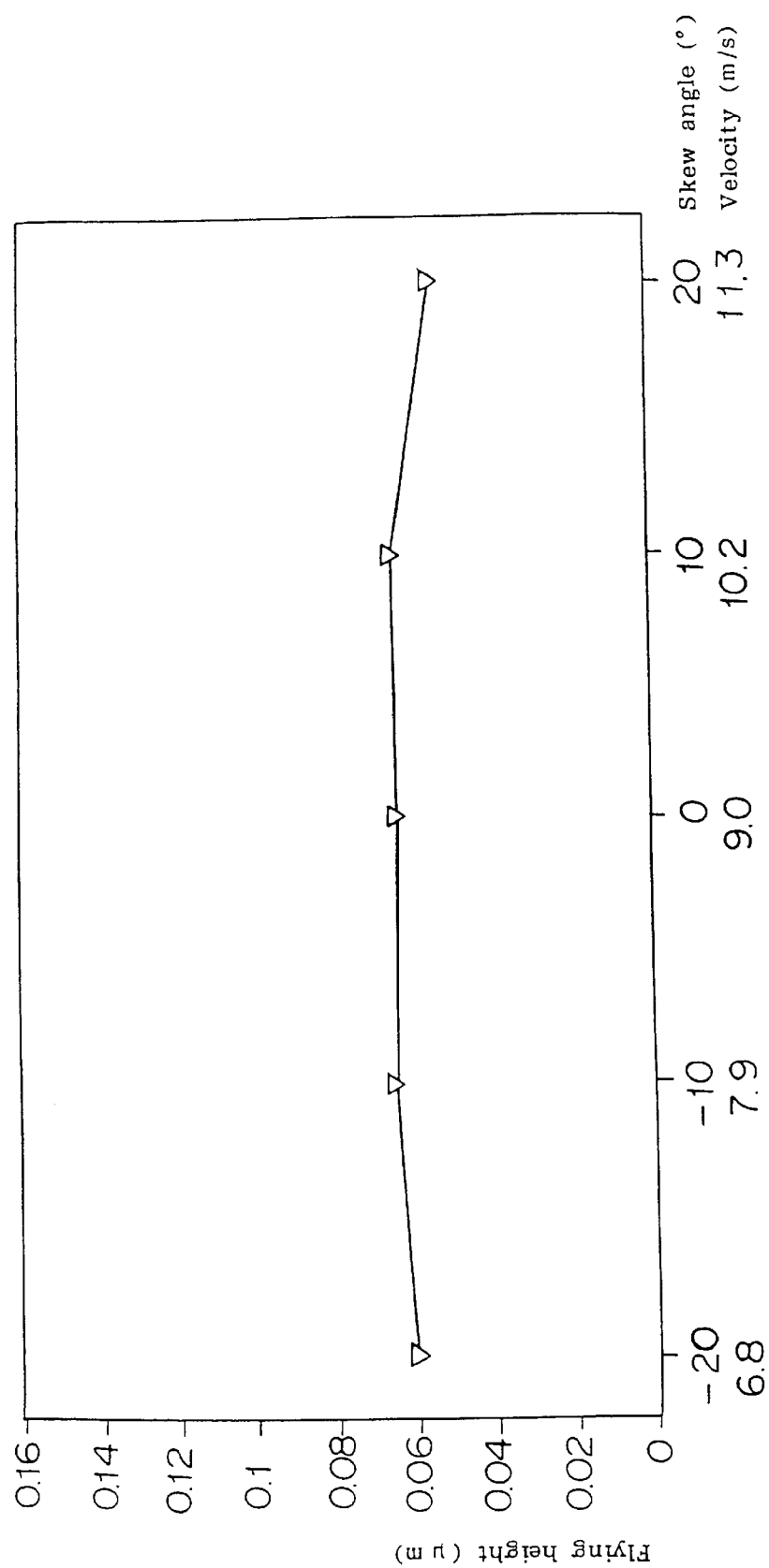
FIG. 15A designates data showing a relationship among the skew angle (degree) of the magnetic head in the invented magnetic disk drive, the corresponding radius of rotation of a magnetic disk (mm) and the flying height (µm)
Figure 16:
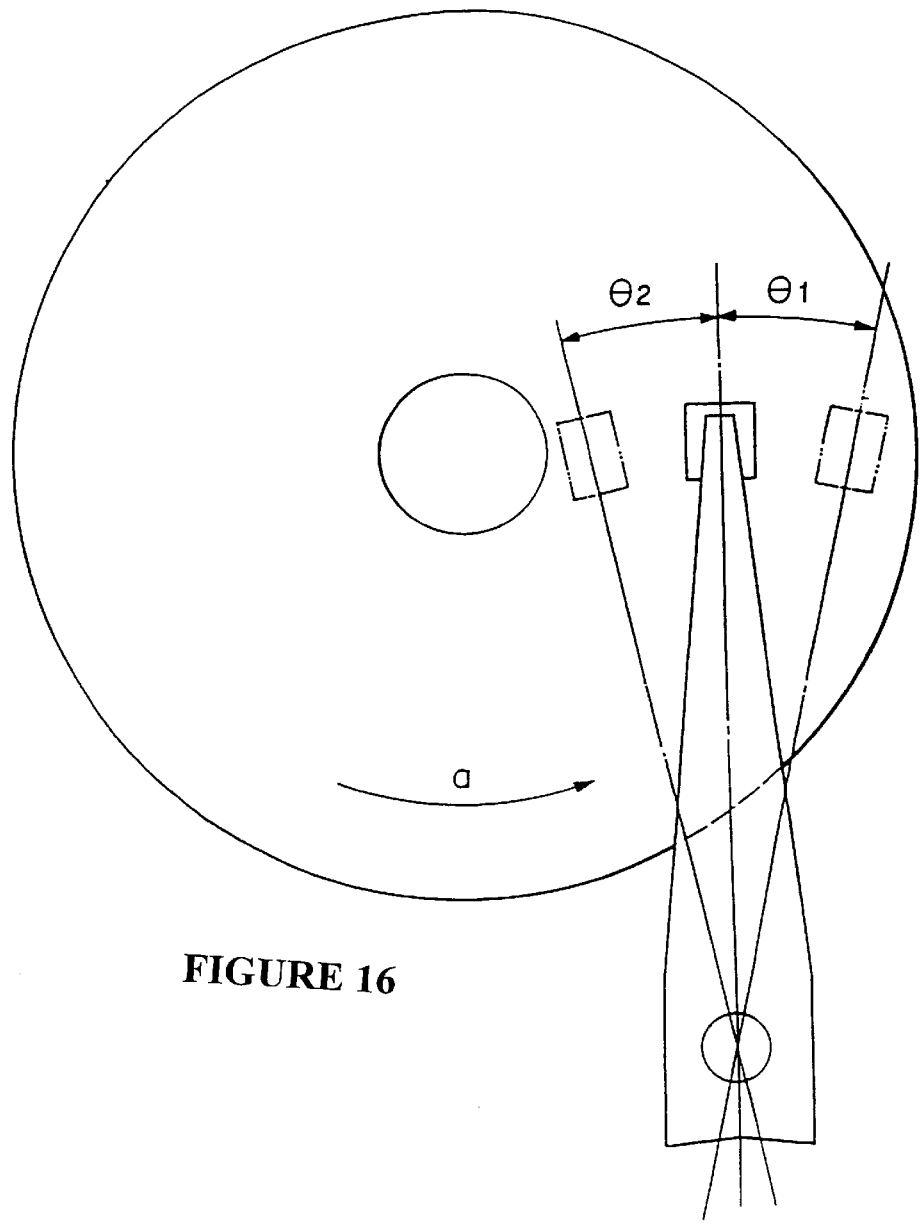
FIG. 16 is a diagram for explaining the skew angle shown in the data of FIG. 15.

FIG. 15B designates data showing a relationship among the skew angle (degree) of the magnetic head in the invented magnetic device, and a corresponding radius of rotation (mm) of the magnetic disk and the flying height ($\mu$m), and FIG. 15A, the similar data for the magnetic head shown in FIG. 5A, the size of which L×W×d is 1 mm×0.3 mm, and FIG. 16 is a diagram for explaining the definition of the skew angle shown in the data of FIGS. 15B and 15A, As should be apparent from FIG. 16, the angles $\theta_1$ and $\theta_2$ correspond to the angles of the magnetic head or slider with respect to a tangent of the rotating disk. In FIGS. 15B and 15A, the abscissas designate the skew angle and the corresponding radius of rotation (mm), and the ordinates, the flying height (mm). As for the magnetic head for FIG. 15B, a slider having the ratio of dimension of 70% (2.8×2.3×0.65) is utilized and the load is set to 6.5 g.

As clearly shown in FIG. 15B, the variation of the flying height is about 0.01 ($\mu$m) or less in a range of the skew angle of 7.7° to 19.9° and a constant flying height can be maintained without being substantially influenced by the size of the skew angle. This reduction of the flying height variation is clearly shown also in FIG. 15A in the skew angle range of −20° to 20°. In this invention, the flying height can be maintained constant by the selection of the dimensions of the slider. Accordingly, since the flying height can be maintained constant, it is not necessary to TPC groove the slider, which is different from the TPC-type sliders disclosed in Japanese Unexamined Patent Publication No. 278087/1986, U.S. Pat. Nos. 4,673,996 and 4,870,519.

Figure 17:
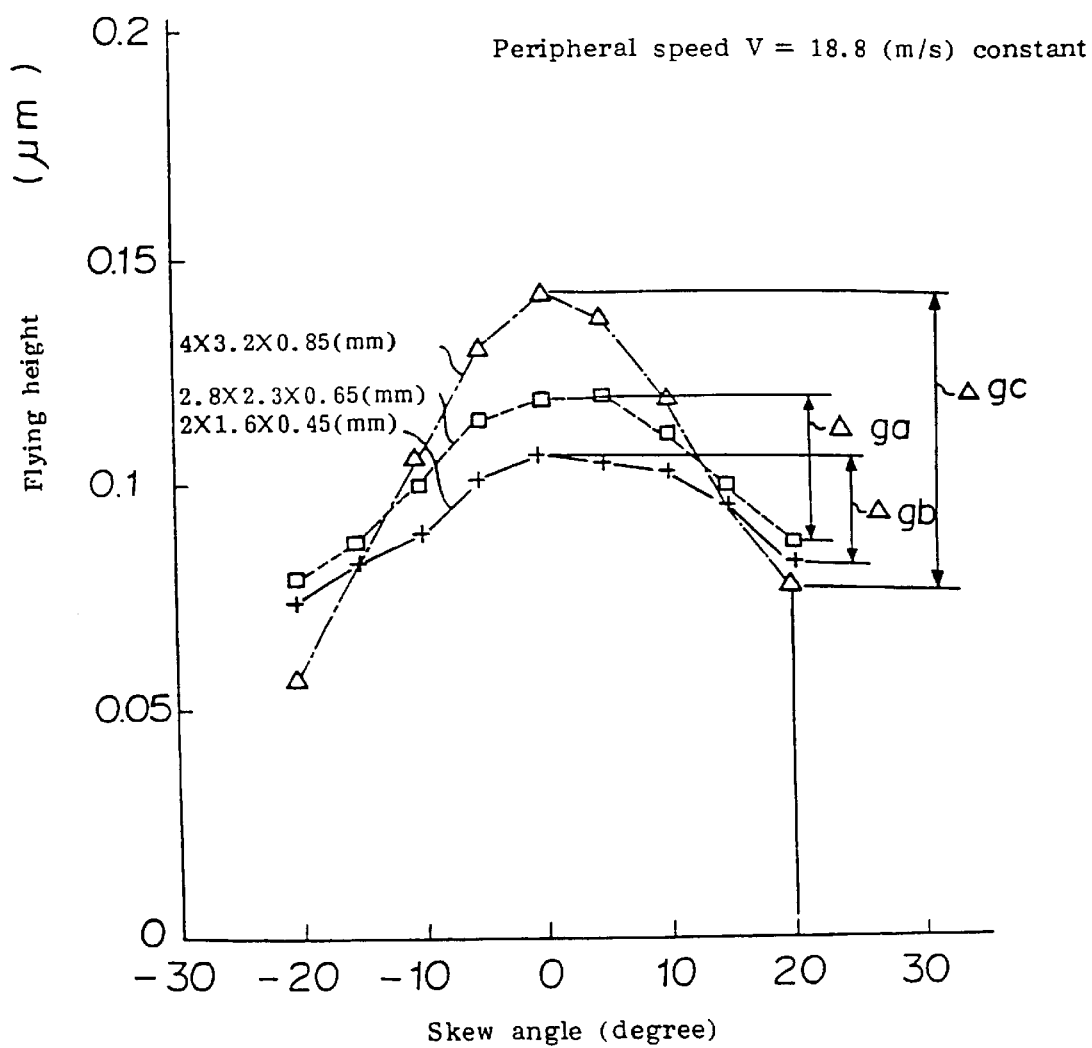
FIG. 17 is a diagram showing data of the characteristic of the skew angle versus the flying height when the peripheral speed V of the magnetic disk is maintained to a constant value.

The basis of the fact that the invented magnetic disk drive is not provided with the skew angle dependency can be explained as referring to the following test results. FIG. 17 is a diagram showing data for the characteristic of the skew angle versus the flying height when the peripheral speed V of the magnetic disks is maintained at a constant value of V=18.8 (m/s). As mentioned above, the □ mark shown at a data plotting point designates the data when the invented magnetic head A is utilized, the + mark, the data when the invented magnetic head B is utilized, and the Δ mark, the data when the conventional magnetic head C is utilized, respectively. Accordingly, the Δ mark represents the data of the conventional magnetic disk device, whereas the □ mark and the + mark, the data of the invented magnetic devices.

As shown in FIG. 17 by the data of the invented magnetic disk devices (the data of the □ mark and the + mark) compared with the data of the conventional magnetic disk device (the data of the Δ mark), the variation width of the flying height corresponding to the change of the skew angle is considerably reduced for the invented disk devices. For example, in a range of the skew angle of −5 to +20 degree, the variation width of the flying height Δga when the invented magnetic head A is utilized and the variation width of the flying height Δgb when the invented magnetic head B is utilized, are considerably smaller than the variation width of the flying height Δgc when the conventional magnetic head C is utilized. FIG. 17 designates the data which is obtained by maintaining the peripheral speed of the magnetic disk to a constant value of 18.8 (m/s). Therefore, the flying height mainly depends on the skew angle. Therefore, in the magnetic disk device utilizing the invented magnetic head, the skew angle dependency is considerably reduced compared with the conventional one.

Figure 18:
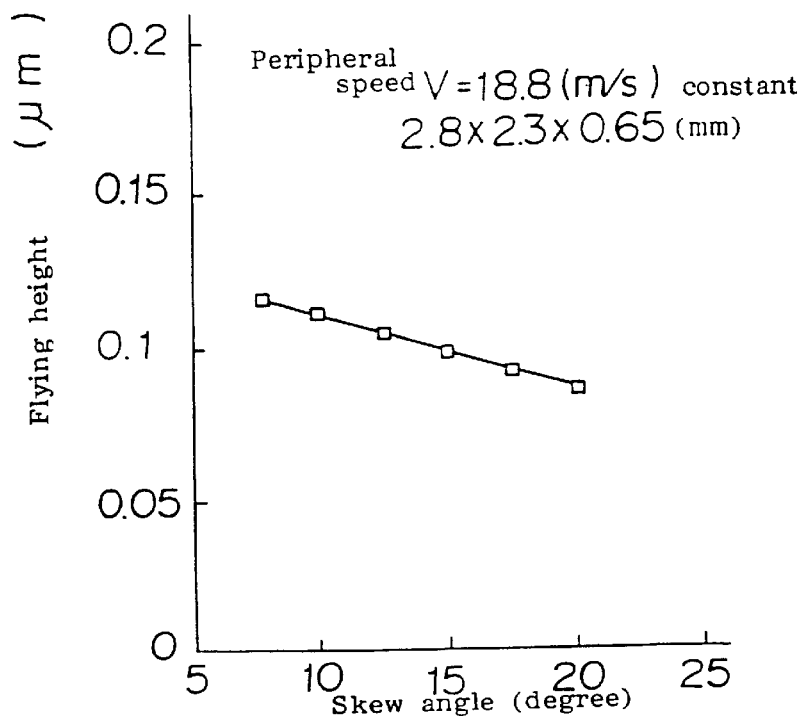
FIG. 18 is a diagram showing data of the characteristic of the skew angle versus the flying height.

Next, FIG. 18 shows the data of the characteristic of the skew angle versus the flying height when the skew angle is set in a range of 5 to 20 degree. The peripheral speed of the magnetic disk V is set to a constant value of V=18.8 (m/s). As the magnetic head, the magnetic head A (2.8 mm×2.3 mm×0.65 mm) is utilized. As shown in FIG. 18, the larger the skew angle, the lower the flying height.

Figure 19:
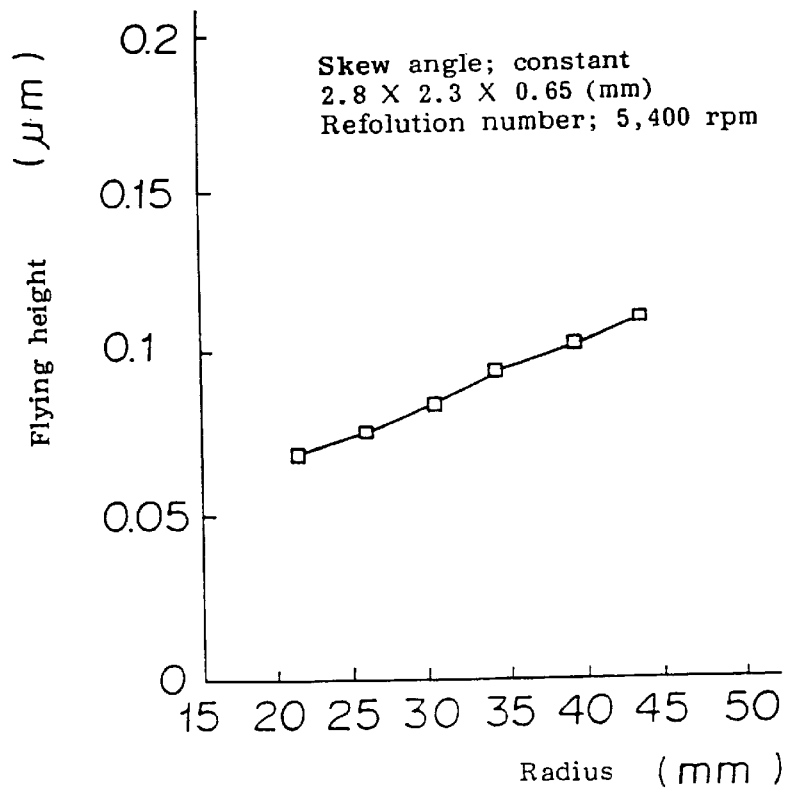
FIG. 19 is a diagram showing data of the characteristic of the peripheral speed of magnetic disk versus the flying height.

Next, FIG. 19 designates the data of the characteristic of the peripheral speed of the magnetic disk versus flying height. To cancel the skew angle dependency, the skew angle is set to 0 degree. As shown in FIG. 18, the larger the peripheral speed, the more increased is the flying height.

In the actual magnetic disk device, the skew angle and the peripheral speed change simultaneously. Therefore, a characteristic synthesized by those of FIGS. 18 and 19 is obtained. As shown in FIGS. 17 and 18, the invented magnetic head A is provided with a small skew angle dependency of the flying height. In the invented magnetic head A, when the skew angle dependency is coupled with the peripheral speed dependency of FIG. 19, the peripheral speed dependency of the flying height is almost canceled out. This is the same also in the case of the magnetic head B. Accordingly, as shown in FIG. 15, the constant flying height can be maintained without being substantially influenced by the size of the skew angle.

The advantages wherein the constant flying height can be maintained without being substantially influenced by the size of skew angle, are as follows.

First, since the constant flying height can be maintained without being substantially influenced by the size of the skew angle, it is possible to adopt the zone bit recording system and high density recording. The zone bit recording system is a technology developed for high recording density, which is described in U.S. Pat. Nos. 4,894,734, 4,999,720 and 5,087,992.

Next, since the skew angle can be set to a large value, it is possible to shorten the length of the head supporting device supporting the magnetic head. Therefore, a downsized magnetic disk drive can be realized. Using the conventional magnetic head, the movable range of skew angle is 11 to 19 degrees. In the invented magnetic head, the movable range of the skew angle can be set in a range of −20 to 20 degree. Combined with the zone bit recording system, a downsized magnetic disk drive having a high density recording and a high capacity can be provided even when the magnetic disk drive is of small dimensions.

Although the embodiment has been described, modifications to the embodiment for further improve the head flying characteristics will be described in the following (1) through (3).

Figure 23A:
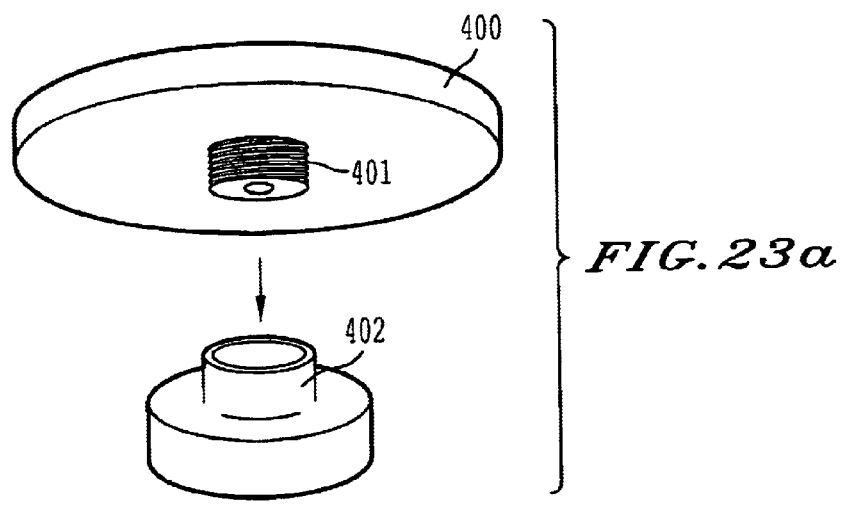
FIG. 23(a) is a schematical view showing connection between a magnetic disk and a spindle shaft of motor according to the present invention.
Figure 23B:
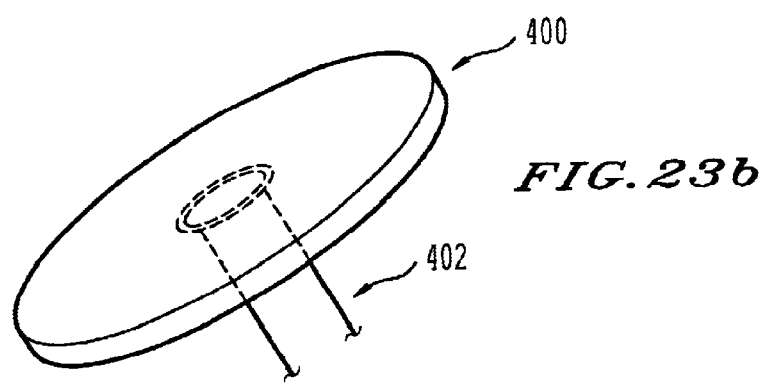
FIG. 23(b) is a schematical perspective view showing connection between the magnetic disk and the spindle shaft of the motor according to the present invention.
Figure 23C:
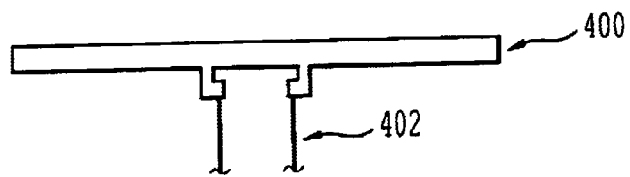
FIG. 23(c) is a schematical side view showing connection between the magnetic disk and the spindle shaft of the motor according to the present invention.

(1) The diameter of the magnetic disk may be 2.5 inches or shorter and a hole may not be formed in the center of the disk for fixing the spindle shaft as illustrated in FIGS. 23(*a*)–(*c*).

In FIGS. 23(*a*)–(*c*), numerical reference 400 designates a magnetic disk having a boss on a rotational center thereof, numerical reference 401 designates the boss with male screw-thread cut on the outer periphery thereof, and numerical reference 402 designates a spindle shaft of a motor for rotating the disk, the spindle shaft being provided with screw-thread so as to be engaged with the boss. Instead of this male screw-thread on an outer periphery of the boss, female screw-thread may be cut on an inner periphery of a cylindrical boss. Then a spindle shaft of a motor is cut to have male screw thread to be engaged with the boss.

However, it is also possible to directly bond the boss to the spindle shaft of the motor without providing the screw-thread portions in the boss of the disk and the spindle shaft of the motor when the diameter of disk is small.

This structure increases an actual recording area in the disk toward the center in directions of diameter because the center is then usable for the recording area because it is not occupied with a hole to be engaged with the spindle shaft. This structure is enabled by adopting a small head and a rotary structure to control flying posture and flying stability.

Figure 24:
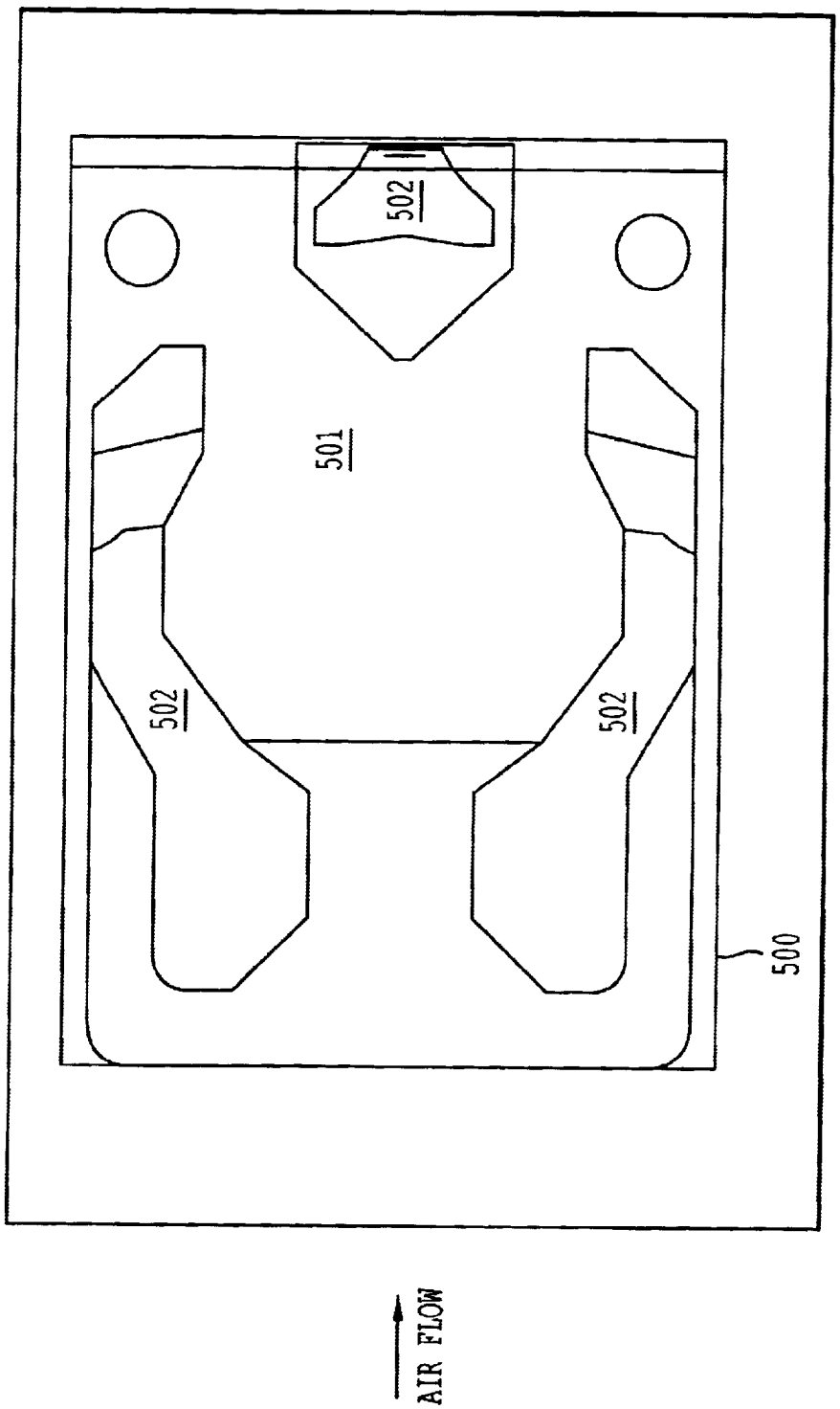
FIG. 24 is a plan view of an air bearing surface (ABS) of magnetic head of a negative pressure type showing the structure thereof.

(2) The slider may be of a negative pressure type as illustrated in FIG. 24. In this case, the flying stability of the head can be further improved even though the height of the flying head is very low. In FIG. 24, numerical reference 500 designates a slider; numerical reference 501 designates a negative pressure generating groove and numerical reference 502 designates a positive pressure generating pad, i.e. a rail.

(3) A hard disk drive (HDD) having the above mentioned features (1) and (2) may be formed by a single head and a single disk to make the thickness of a drive thinner, whereby various applications become possible. One of the applications is to mobile computing.

As stated above, according to the present invention, the following effects can be provided.

(a) A magnetic disk drive can be provided wherein the rolling angle is lowered in a range not predictable from the ratio of dimension between the invented magnetic head and the conventional magnetic head, the spacing loss is reduced, and the flying posture is stabilized, and which is suitable for high recording density.

(b) Since the selection of the configuration of the slider is performed as a means of reducing the rolling angle, a magnetic disk drive can be provided wherein the flying height can be lowered without causing the problems of the deviation of mass with respect to the center of motion of the slider, and the nonuniformity of the moment of momentum, while stabilizing the flying posture and securing reliability.

(c) Since the constant flying height can be maintained without being substantially influenced by the size of the skew angle, the zone bit recording system can be adopted and a magnetic disk drive having a small size with a high recording density and a high capacity can be provided.

(d) Since the flying height can be maintained without being substantially influenced by the size of the skew angle, the skew angle can be set at a large value and a downsized magnetic disk drive can be provided.

(e) Since the width of the slider in a direction orthogonal to the air discharge direction, is 2.5 mm or less, or preferably 0.5 to 2.5 mm, compared with the slider of the conventional magnetic head, the landing area viewed in the direction of track arrangement can be considerably reduced when the magnetic head is stationary on the magnetic disk. Accordingly, the number of tracks on the magnetic disk can be increased, which contributes to the increase of the recording density and the recording capacity. In the magnetic head having thin film reading/writing elements of general dimensions, compared with the conventional one, the recording area can be increased by about 80 tracks.

(f) Since the thickness d of the slider is 0.65 mm or less, the magnetic disk drive can be thinned to about 70% or less of the conventional one. By this thinning, the number of magnetic disks which can be accommodated in the downsized and limited space of the magnetic disk drive is increased thereby achieving a further higher capacity.

(g) Since the slider is provided with dimensions wherein the thickness thereof from the flying plane to the opposite surface on the reversed side is 0.65 mm or less, the length in the air discharge direction is 3 mm or less, or preferably 0.5 to 3 mm and the width in a direction orthogonal to the air discharge direction is 2.5 mm or less, or preferably 0.5 to 2.5 mm, a magnetic disk drive having high flying stability for the magnetic head can be provided.

(h) By the downsizing of a total configuration of the slider, the dynamic lift is lowered and accordingly, the spring pressure can be lowered. Therefore, the loading force exerted from the flying plane to the magnetic disk during the contact time is lowered and the friction and wear thereof are reduced thereby promoting durability.

(i) Since the static friction associated with CSS starting is reduced, the driving torque of the disk driving motor is decreased, and power consumption is reduced. Accordingly, a downsized magnetic disk drive capable of being driven using a cell is provided.

Obviously, numerous modifications and variations of the present invention are possible in light of the above teachings. It is therefore to be understood that within the scope of the appended claims, the invention may be practiced otherwise than as specifically described herein.

The entire disclosure of priority document Japanese Patent Application No. 1991-114118 filed on Oct. 31, 1991 including specification, claims, drawings and summary are incorporated herein by reference in its entirety.

What is claimed is:

1. A method of maintaining a flying height of a magnetic head on a magnetic disk of circular shape with a diameter of 2.5 inches or shorter and no hole at the center thereof substantially constant irrespective of a change of a skew angle comprising the steps of:

rotating the magnetic disk;

providing a negative pressure type slider with flying planes on a side thereof opposing the magnetic disk, with a thickness from each of the flying planes to an opposite surface on a reverse side thereof in a range of 0.30 to 0.65 mm, with a length in a first direction of air discharge thereof in a range of 1.2 to 2.8 mm, and with a width in a second direction orthogonal to the first direction in a range of 1.0 to 2.3 mm, said slider being further provided free of any transverse pressurization contours, slider rolling compensation grooving, or other slider rolling compensation elements on any portion thereof;

attaching a magnetic head at the air discharge end of the slider, said attached magnetic head including reading/writing elements arranged on a first side and an opposite second side of the air discharge end of the slider;

providing a head supporting device configured to support the slider and attached magnetic head at a first end thereof by attachment to a middle position of the slider in a maimer that does not deviate a center of motion of the slider and does not provide rolling compensation relative to the slider and attached magnetic head;

providing a positioning device configured to support a second end of said head supporting device opposite to said first end at a pivot point in a manner that does not provide rolling compensation relative to the slider and attached magnetic head;

rotating the magnetic disk; and pivoting the first end of the head supporting device relative to the second end thereof supported by the positioning device at said pivot point to thereby move said slider with the attached magnetic head at the first end thereof above said rotating magnetic disk with the first side of the air discharge end of the slider being oriented in a direction toward the center of the magnetic disk while the opposite second side is oriented in a direction toward the outer periphery of the magnetic disk, said slider movement relative to the rotating magnetic disc being along an arcuate path that establishes a different skew angle between a longitudinal direction of the slider and a tangent of said magnetic disk relative to different radial magnetic disk locations;

wherein the reading/writing element arranged on the first side of the air discharge end of the slider undergoes a first amount of separation from the rotating magnetic disk and the reading/writing element arranged on the opposite second side of the air discharge end of the slider undergoes a second amount of separation from the rotating magnetic disk that is greater than said first amount of separation due to the slider rolling when said slider with the attached magnetic head is moved above said magnetic disk to said different radial locations associated with different skew angles, with the difference between the second amount of separation and the first amount of separation determining the flying height of the slider and attached magnetic head above the magnetic disk, said flying height not changing more than 0.02 μm, when the flying height is set to be 0.1 μm and the skew angle is changed in a range of −20 to 20 degrees without providing slider rolling compensation relative to the slider and attached magnetic head or any of the structure moving or supporting the slider and attached magnetic head.

2. The method of maintaining the flying height of the magnetic head according to claim 1, wherein the number of the magnetic head and the number of the magnetic disk are one.

3. A magnetic disk drive, comprising:

a magnetic disk of circular shape with a diameter of 2.5 inches or shorter and no hole at the center thereof;

a disk support configured to support said magnetic disk;

a drive mechanism configured to rotate said disk support and said magnetic disk supported thereby;

a negative pressure type slider configured to have flying planes on a side thereof opposing the magnetic disk, with a slider thickness from each of the flying planes to an opposite surface on a reverse side thereof being 0.30 to 0.65 mm, with a slider length in a first direction of air discharge thereof being 1.2 to 2.8 mm, and with a slider width in a second direction orthogonal to the first direction being 1.0 to 2.3 mm, said slider further being configured to be free of any transverse pressurization contours, slider rolling compensation grooving, or other slider rolling compensation elements on any portion thereof;

a magnetic head attached at the air discharge end of the slider and having reading/writing elements arranged on first and second opposite sides of an air discharge end of the slider;

a head supporting device configured to support the slider at a first end thereof coupled to a middle position of the slider so as to not deviate a center of motion of the slider and in a manner that does not provide rolling compensation relative to the slider and attached magnetic head; and a positioning device configured to support a second end of said head supporting device opposite to said first end at a pivot point and being configured to pivot the head supporting device around the pivot point to move the head supporting device above said rotating magnetic disk in a manner that does not provide rolling compensation relative to the slider and attached magnetic head with the first side of the air discharge end of the slider being oriented in a direction toward the center of the magnetic disk while the opposite second side is oriented in a direction toward the outer periphery of the magnetic disk, said slider movement relative to the rotating magnetic disc being along an arcuate path having an arc determined by a length of the pivoting head supporting device, said arc determining a different skew angle between a longitudinal direction of the slider and a tangent of said magnetic disk relative to different radial locations of the slider with attached magnetic head over the magnetic disk;

wherein the reading/writing element arranged on the first side of the air discharge end of the slider undergoes a first amount of separation from the rotating magnetic disk and the reading/writing element arranged on the opposite second side of the air discharge end of the slider undergoes a second amount of separation from the rotating magnetic disk that is greater than said first amount of separation due to the slider rolling when said slider with the attached magnetic head is moved above said magnetic disk to said different radial locations associated with different skew angles, with the difference between the second amount of separation and the first amount of separation establishing a flying height of the slider and attached magnetic head, with said flying height being maintained at about 0.1 μm with changes to the flying height of the slider and attached magnetic head being 0.02 μm or less when said slider with the attached magnetic head is moved above said rotating magnetic disk to said different radial locations associated with different skew angles without providing rolling compensation relative to the slider and attached magnetic head or any of the structure moving or supporting the slider and attached magnetic head.

4. The magnetic disk drive according to claim 3, wherein each of the reading/writing elements is a thin film element.

5. The magnetic disk drive according to claim 3 or claim 4, wherein each of the flying planes is a plane having no tapered portion at an air inflow end thereof.

6. The magnetic disk drive according to claim 3, wherein said positioning device is configured to pivot and move the slider to radial locations over the magnetic disk that correspond to skew angles in a skew angle range of −20 to 20 degrees.

7. The magnetic disk drive according to claim 3, wherein the number of the magnetic head and the number of the magnetic disk are one.

* * * * *

UNITED STATES PATENT AND TRADEMARK OFFICE
CERTIFICATE OF CORRECTION

PATENT NO. : 6,680,820 B2  
DATED : January 20, 2004  
INVENTOR(S) : Matsuzaki et al.

It is certified that error appears in the above-identified patent and that said Letters Patent is hereby corrected as shown below:

<u>Title page,</u>  
Item [30], Foreign Application Priority Data, should be deleted  
Item [75], Inventor, should read as follows:  
-- [75] Inventors:  Mikio Matsuzaki, Tokyo (JP);  
                      Kazumasa Fukuda, Tokyo (JP);  
                      Takamitsu Tsuna, Tokyo (JP) --

Signed and Sealed this

Eighteenth Day of May, 2004

JON W. DUDAS  
*Acting Director of the United States Patent and Trademark Office*